(12) United States Patent
Yang

(10) Patent No.: US 12,014,087 B2
(45) Date of Patent: Jun. 18, 2024

(54) METHOD AND APPARATUS FOR PERFORMING DATA MANAGEMENT OF MEMORY DEVICE WITH AID OF TARGETED PROTECTION CONTROL

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/869,735

(22) Filed: Jul. 20, 2022

(65) Prior Publication Data

US 2024/0028258 A1    Jan. 25, 2024

(51) Int. Cl.
    *G06F 3/06* (2006.01)
(52) U.S. Cl.
    CPC .......... *G06F 3/0659* (2013.01); *G06F 3/0604* (2013.01); *G06F 3/0679* (2013.01)
(58) Field of Classification Search
    None
    See application file for complete search history.

(56) References Cited

U.S. PATENT DOCUMENTS

| | | | | |
|---|---|---|---|---|
| 2014/0075265 | A1* | 3/2014 | Hung | G11C 29/44 714/763 |
| 2015/0339188 | A1* | 11/2015 | Hu | G06F 11/3034 714/704 |
| 2018/0286485 | A1* | 10/2018 | Takizawa | G11C 16/0483 |
| 2019/0377641 | A1 | 12/2019 | Hong | |

FOREIGN PATENT DOCUMENTS

| | | |
|---|---|---|
| CN | 108572791 A | 9/2018 |
| TW | 200917263 | 4/2009 |
| TW | 201631596 A | 9/2016 |
| TW | 201734794 A | 10/2017 |

* cited by examiner

*Primary Examiner* — Brian R Peugh
(74) *Attorney, Agent, or Firm* — Winston Hsu

(57) ABSTRACT

A method for performing data management of a memory device with aid of targeted protection control and associated apparatus are provided. The method may include: receiving a first host command from a host device; sending a first operating command to a non-volatile (NV) memory to read first stored data from a first location within the NV memory; monitoring a read count of the first location to determine whether the read count of the first location reaches a read count threshold; monitoring at least one error bit count of other stored data of at least one other location within the NV memory to determine whether the at least one error bit count reaches an error bit count threshold; and starting a targeted protection procedure to process second stored data, for preventing the second stored data from being damaged by at least one reading behavior of the host device.

16 Claims, 11 Drawing Sheets

METHOD AND APPARATUS FOR PERFORMING DATA MANAGEMENT OF MEMORY DEVICE WITH AID OF TARGETED PROTECTION CONTROL

BACKGROUND OF THE INVENTION

1. Field of the Invention

The present invention is related to memory control, and more particularly, to a method and apparatus for performing data management of a memory device with aid of targeted protection control.

2. Description of the Prior Art

A memory device may comprise a Flash memory for storing data, and the management of accessing the Flash memory is complicated. For example, the memory device may be a memory card, a solid state drive (SSD), or an embedded storage device such as that conforming to Universal Flash Storage (UFS) specification. When the memory device such as the SSD is used as a system disk, some problems may occur. More particularly, a certain file stored in the SSD that is used as the system disk may be frequently read. When the SSD is designed to have higher storage capacity, the physical blocks for storing data within the SSD may be quadruple level cell (QLC) blocks, where the QLC blocks may have shorter expected lifetimes than that of triple level cell (TLC) blocks and may be not as reliable as the TLC blocks, and frequently reading the location at which this file is stored within the SSD may cause programming states of memory cells at one or more locations (e.g., the location at which this file is stored and/or one or more neighboring locations) within the SSD to be changed. As a result, there may be data errors at the one or more locations within the SSD. In addition, various types of error handling mechanisms of the SSD may be triggered by the data errors. As a result, the SSD may spend too much time on performing some internal operations regarding the various types of error handling mechanisms, and therefore cannot immediately operate in response to host-side requests, causing the overall performance to be reduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data management of a memory device with aid of targeted protection control, in order to solve the above-mentioned problems.

At least one embodiment of the present invention provides a method for performing data management of a memory device with aid of targeted protection control, where the method can be applied to a memory controller of the memory device. The memory device may comprise the memory controller and a non-volatile (NV) memory, and the NV memory may comprise at least one NV memory element (e.g., one or more NV memory elements). The method may comprise: receiving a first host command from a host device, wherein the first host command indicates that reading first stored data is requested, and the first stored data is stored at a first location within the NV memory; in response to the first host command, sending a first operating command to the NV memory to read the first stored data from the first location within the NV memory, for being returned to the host device; monitoring a read count of the first location to determine whether the read count of the first location reaches a read count threshold, wherein the read count of the first location is recorded in a read count table within the NV memory; in response to the read count of the first location reaching the read count threshold, monitoring at least one error bit count of other stored data of at least one other location within the NV memory to determine whether the at least one error bit count reaches an error bit count threshold, wherein the at least one other location comprises a second location within the NV memory, and the other stored data comprises second stored data stored at the second location; and in response to the at least one error bit count reaching the error bit count threshold, starting a targeted protection procedure to process the second stored data, for preventing the second stored data from being damaged by at least one reading behavior of the host device, wherein the at least one reading behavior of the host device comprises sending the first host command for reading the first stored data.

In addition to the above method, the present invention also provides a memory device, and the memory device comprises a NV memory and a memory controller. The NV memory is arranged to store information, wherein the NV memory may comprise at least one NV memory element (e.g. one or more NV memory elements). The memory controller is coupled to the NV memory, and the memory controller is arranged to control operations of the memory device. In addition, the memory controller comprises a processing circuit that is arranged to control the memory controller according to a plurality of host commands from a host device, to allow the host device to access the NV memory through the memory controller. For example, the memory controller receives a first host command from the host device, wherein the first host command indicates that reading first stored data is requested, and the first stored data is stored at a first location within the NV memory; in response to the first host command, the memory controller sends a first operating command to the NV memory to read the first stored data from the first location within the NV memory, for being returned to the host device; the memory controller monitors a read count of the first location to determine whether the read count of the first location reaches a read count threshold, wherein the read count of the first location is recorded in a read count table within the NV memory; in response to the read count of the first location reaching the read count threshold, the memory controller monitors at least one error bit count of other stored data of at least one other location within the NV memory to determine whether the at least one error bit count reaches an error bit count threshold, wherein the at least one other location comprises a second location within the NV memory, and the other stored data comprises second stored data stored at the second location; and in response to the at least one error bit count reaching the error bit count threshold, the memory controller starts a targeted protection procedure to process the second stored data, for preventing the second stored data from being damaged by at least one reading behavior of the host device, wherein the at least one reading behavior of the host device comprises sending the first host command for reading the first stored data.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a memory controller of a memory device, where the memory device comprises the memory controller and a NV memory. The NV memory may comprise at least one NV memory element (e.g. one or more NV memory elements). In addition, the memory controller comprises a processing circuit that is arranged to control the memory controller according to a plurality of host commands from a host device, to allow the host device to access the NV memory through the memory controller. For example, the memory controller receives a first host command from the host device, wherein the first host command indicates that reading first stored data is requested, and the first stored data is stored at a first location within the NV memory; in response to the first host command, the memory controller sends a first operating command to the NV memory to read the first stored data from the first location within the NV memory, for being returned to the host device; the memory controller monitors a read count of the first location to determine whether the read count of the first location reaches a read count threshold, wherein the read count of the first location is recorded in a read count table within the NV memory; in response to the read count of the first location reaching the read count threshold, the memory controller monitors at least one error bit count of other stored data of at least one other location within the NV memory to determine whether the at least one error bit count reaches an error bit count threshold, wherein the at least one other location comprises a second location within the NV memory, and the other stored data comprises second stored data stored at the second location; and in response to the at least one error bit count reaching the error bit count threshold, the memory controller starts a targeted protection procedure to process the second stored data, for preventing the second stored data from being damaged by at least one reading behavior of the host device, wherein the at least one reading behavior of the host device comprises sending the first host command for reading the first stored data.

The present invention method and apparatus can guarantee that the memory device can operate properly in various situations, and more particularly, prevent spending too much time on performing some internal operations of the memory device in response to host-side write requests. For example, in a situation where the memory device such as a solid state drive (SSD) is used as a system disk, the memory device (e.g., the memory controller therein) can perform data management with aid of targeted protection control, to enhance the data protection of the memory device, and therefore guarantee data storage reliability of the memory device with respect to time. As a result, the memory device (e.g., the memory controller therein) can reduce the probability of triggering error handling mechanisms, and can operate properly without being hindered by some internal operations of the memory device (e.g., the internal operations regarding various types of error handling mechanisms of the memory device). In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
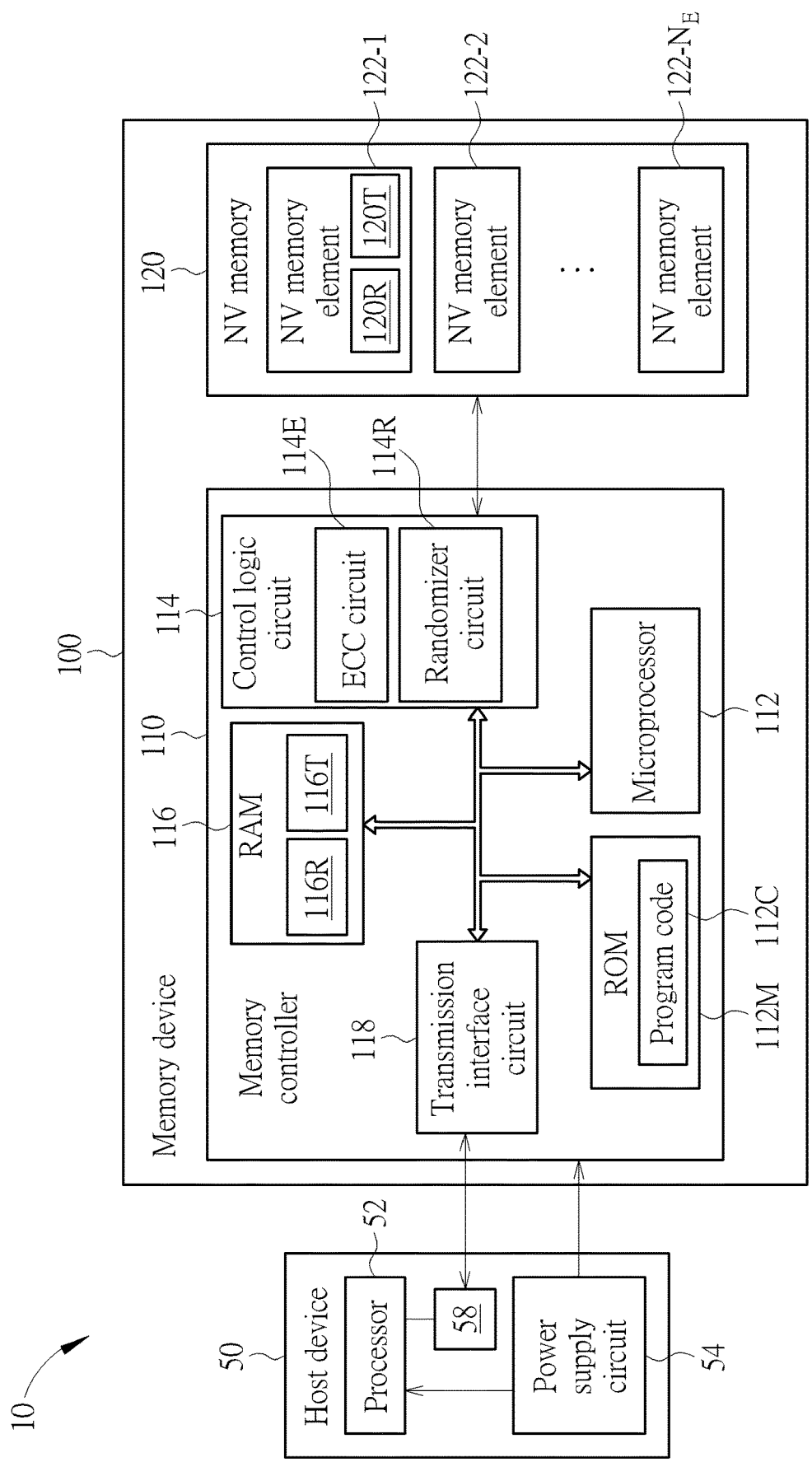
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the memory controller 110 is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-$N_E$, where "$N_E$" may represent a positive integer that is greater than one. For example, the NV memory 120 may be a flash memory, and the plurality of NV memory elements 122-1, 122-2, . . . , and 122-$N_E$ may be a plurality of flash memory chips or a plurality of flash memory dies, respectively, but the present invention is not limited thereto.

As shown in FIG. 1, the memory controller 110 may comprise a processing circuit such as a microprocessor 112, a storage module such as a read only memory (ROM) 112M, a control logic circuit 114, a random access memory (RAM) 116 (which may be implemented by way of static random access memory (SRAM), for example), and a transmission interface circuit 118, where at least one portion (e.g., a portion or all) of the above components may be coupled to one another via a bus. The RAM 116 may comprise multiple storage regions, and may be arranged to provide the memory controller 110 with internal storage space (for example, may temporarily store information), and more particularly, may comprise a buffer (not shown) that is implemented with one of the multiple storage regions, for buffering data such as write data (e.g., data to be written) from the host device 50, read data (e.g., data to be read) from the NV memory 120, etc., but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit 114E for performing ECC encoding and ECC decoding operations in order to protect data and/or perform error correction, and may further comprise a randomizer circuit 114R for performing randomizing and de-randomizing operations.

For example, during a write procedure, the memory controller 110 (e.g., the microprocessor 112) can utilize the ECC circuit 114E (e.g., an ECC encoder therein) to perform ECC encoding operations on the write data (e.g., the aforementioned data to be written) from the host device 50, in order to generate encoded data of the write data, and can utilize the randomizer circuit 114R (e.g., a randomizer therein) to perform randomizing operations on the encoded data to generate randomized data and store the randomized data into the NV memory 120. In addition, during a read procedure, the memory controller 110 (e.g., the microprocessor 112) can utilize the randomizer circuit 114R (e.g., a de-randomizer therein) to perform de-randomizing operations on previously stored data such as the randomized data, in order to generate de-randomized data such as a recovered version of the encoded data, and can utilize the ECC circuit 114E (e.g., an ECC decoder therein) to perform ECC decoding operations on the de-randomized data such as the recovered version of the encoded data, in order to generate decoded data such as a recovered version of the write data (e.g., the aforementioned data to be written) to be the read data (e.g., the aforementioned data to be read), for being returned to the host device 50. This is for illustrative purpose only, and is not meant to be a limitation of the present invention. According to some embodiments, the order of performing the ECC encoding operations and the randomizing operations and the order of performing the ECC decoding operations and the de-randomizing operations can be changed. For example, during another write procedure, the memory controller 110 (e.g., the microprocessor 112) can utilize the randomizer circuit 114R (e.g., the randomizer therein) to perform randomizing operations on the write data (e.g., the aforementioned data to be written) from the host device 50, in order to generate the corresponding randomized data of the write data, and can utilize the ECC circuit 114E (e.g., the ECC encoder therein) to perform ECC encoding operations on the corresponding randomized data of the write data, in order to generate encoded data of the corresponding randomized data and store the encoded data into the NV memory 120. In addition, during a read procedure, the memory controller 110 (e.g., the microprocessor 112) can utilize the ECC circuit 114E (e.g., an ECC decoder therein) to perform ECC decoding on previously stored data such as the encoded data, in order to generate decoded data such as a recovered version of the corresponding randomized data, and can utilize the randomizer circuit 114R (e.g., a de-randomizer therein) to perform de-randomizing operations on the decoded data, in order to generate de-randomized data such as a recovered version of the write data (e.g., the aforementioned data to be written) to be the read data (e.g., the aforementioned data to be read), for being returned to the host device 50.

Regarding the communications between the memory device 100 (e.g., the memory controller 110) and the host device 50, the transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, Non-Volatile Memory Express (NVMe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specifications for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of corresponding physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses, where the NV memory 120 may store a global L2P address mapping table 120T, for the memory controller 110 to control the memory device 100 to access data in the NV memory 120, but the present invention is not limited thereto. For another example, the memory controller 110 may generate or update a read count table 120R, for the memory controller 110 to perform data management of the memory device 100 with aid of targeted protection control.

For better comprehension, the global L2P address mapping table 120T and/or the read count table 120R (e.g., both of the global L2P address mapping table 120T and the read count table 120R) may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-$N_E$, and more particularly, may be stored in the NV memory elements 122-1, 122-2, . . . , and 122-$N_E$, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto. In addition, the memory controller 110 may load at least one portion (e.g., a portion or all) of the read count table 120R into the RAM 116 or other memories. For example, in a situation where the storage capacity of the RAM 116 is sufficient, the memory controller 110 may load a latest read count table such as the latest version of the read count table 120R into the RAM 116 to be a temporary read count table 116R, for performing data management of the memory device 100 with aid of targeted protection control according to the latest read count table which is stored as the temporary read count table 116R. For another example, in a situation where the storage capacity of the RAM 116 is limited, the memory controller 110 may load a latest read count sub-table such as the latest version of a read count sub-table among multiple read count sub-tables of the read count table 120R into the RAM 116 to be the temporary read count table 116R, for performing data management of the memory device 100 with aid of targeted protection control according to the latest read count sub-table which is stored as the temporary read count table 116R.

In addition, the aforementioned at least one NV memory element (e.g., the one or more NV memory elements such as the NV memory elements {122-1, 122-2, . . . , 122-$N_E$}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, $N_E$]) among the NV memory elements 122-1, 122-2, . . . , and 122-$N_E$ may comprise multiple blocks, and a block within the multiple blocks may comprise and record a specific number of pages, where the memory controller 110 may access a certain page of a certain block within the multiple blocks according to a block address and a page address.

Figure 2:
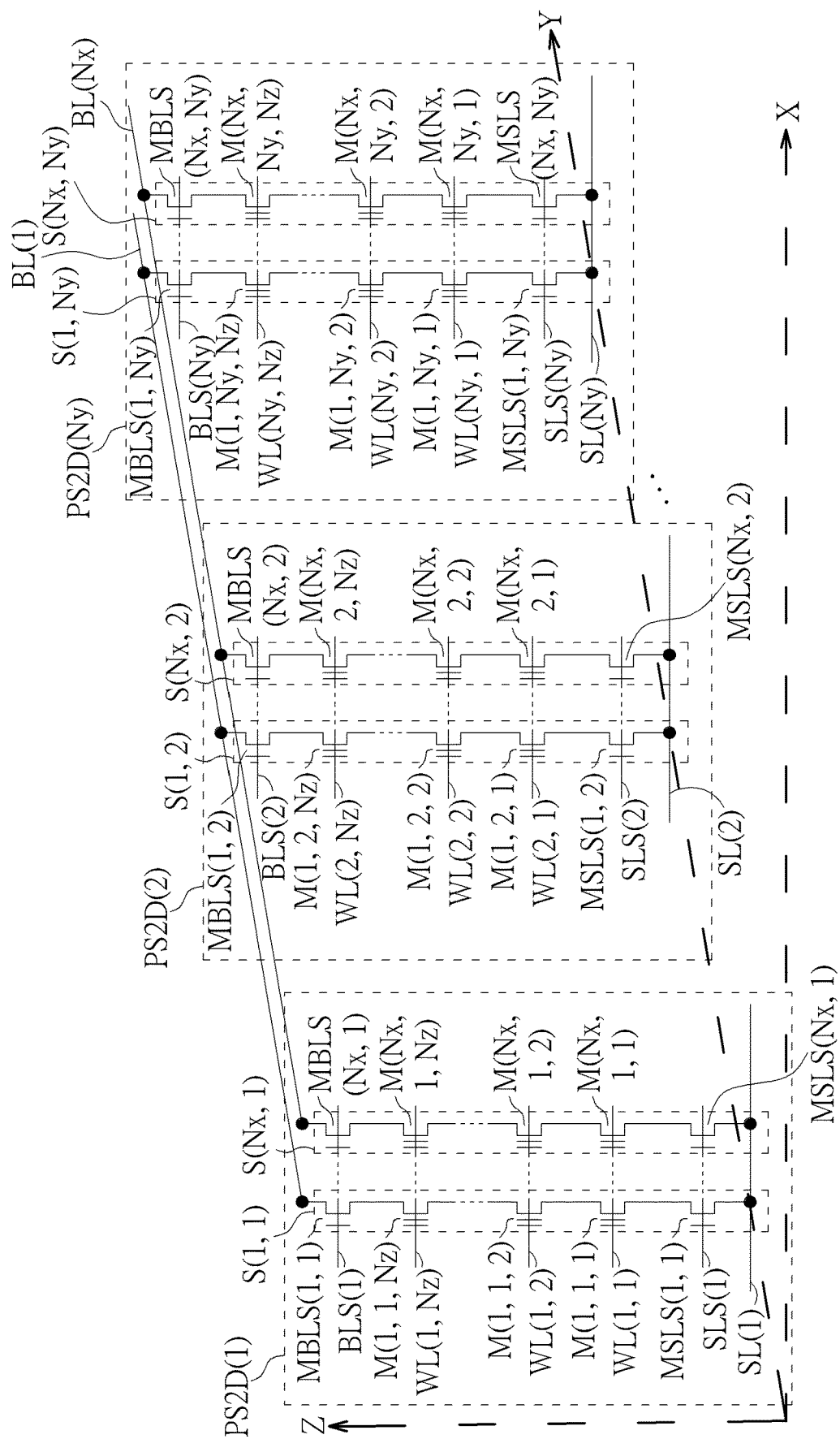
FIG. 2 is a diagram of a three-dimensional (3D) NAND flash memory according to an embodiment of the present invention.

FIG. 2 is a diagram of a three-dimensional (3D) NAND flash memory according to an embodiment of the present invention. For example, any memory element within the aforementioned at least one NV memory element (e.g., the one or more NV memory elements), such as each memory element within the plurality of NV memory elements 122-1, 122-2, . . . , and 122-$N_E$, may be implemented based on the 3D NAND flash memory shown in FIG. 2, but the present invention is not limited thereto.

According to this embodiment, the 3D NAND flash memory may comprise a plurality of memory cells arranged in a 3D structure, such as (Nx*Ny*Nz) memory cells {{M(1, 1, 1), . . . , M(Nx, 1, 1)}, {M(1, 2, 1), . . . , M(Nx, 2, 1)}, . . . , {M(1, Ny, 1), . . . , M(Nx, Ny, 1)}}, {{M(1, 1, 2), . . . , M(Nx, 1, 2)}, {M(1, 2, 2), . . . , M(Nx, 2, 2)}, . . . , {M(1, Ny, 2), . . . , M(Nx, Ny, 2)}}, . . . , and {{M(1, 1, Nz), . . . , M(Nx, 1, Nz)}, {M(1, 2, Nz), . . . , M(Nx, 2, Nz)}, . . . , {M(1, Ny, Nz), . . . , M(Nx, Ny, Nz)}} that are respectively arranged in Nz layers perpendicular to the Z-axis and aligned in three directions respectively corresponding to the X-axis, the Y-axis, and the Z-axis, and may further comprise a plurality of selector circuits for selection control, such as (Nx*Ny) upper selector circuits {MBLS(1, 1), . . . , MBLS(Nx, 1)}, {MBLS (1, 2), . . . , MBLS(Nx, 2)}, . . . , and {MBLS(1, Ny), . . . , MBLS(Nx, Ny)} that are arranged in an upper layer above the Nz layers and (Nx*Ny) lower selector circuits {MSLS(1, 1), . . . , MSLS(Nx, 1)}, {MSLS (1, 2), . . . , MSLS(Nx, 2)}, . . . , and {MSLS(1, Ny), . . . , MSLS(Nx, Ny)} that are arranged in a lower layer below the Nz layers. In addition, the 3D NAND flash memory may comprise a plurality of bit lines and a plurality of word lines for access control, such as Nx bit lines BL(1), . . . , and BL(Nx) that are arranged in a top layer above the upper layer and (Ny*Nz) word lines {WL(1, 1), WL(2, 1), . . . , WL(Ny, 1)}, {WL(1, 2), WL(2, 2), . . . , WL(Ny, 2)}, . . . , and {WL(1, Nz), WL(2, Nz), . . . , WL(Ny, Nz)} that are respectively arranged in the Nz layers. Additionally, the 3D NAND flash memory may comprise a plurality of selection lines for selection control, such as Ny upper selection lines BLS(1), BLS(2), . . . , and BLS(Ny) that are arranged in the upper layer and Ny lower selection lines SLS(1), SLS(2), . . . , and SLS(Ny) that are arranged in the lower layer, and may further comprise a plurality of source lines for providing reference levels, such as Ny source lines SL(1), SL(2), . . . , and SL(Ny) that are arranged in a bottom layer below the lower layer.

As shown in FIG. 2, the 3D NAND flash memory may be divided into Ny circuit modules PS2D(1), PS2D(2), . . . , and PS2D(Ny) distributed along the Y-axis. For better comprehension, the circuit modules PS2D(1), PS2D(2), . . . , and PS2D(Ny) may have some electrical characteristics similar to that of a planar NAND flash memory having memory cells arranged in a single layer, and therefore may be regarded as pseudo-2D circuit modules, respectively, but the present invention is not limited thereto. In addition, any circuit module PS2D(ny) of the circuit modules PS2D(1), PS2D(2), . . . , and PS2D(Ny) may comprise Nx secondary circuit modules S(1, ny), . . . , and S(Nx, ny), where "ny" may represent any integer in the interval [1, Ny]. For example, the circuit module PS2D(1) may comprise Nx secondary circuit modules S(1, 1), . . . , and S(Nx, 1), the circuit module PS2D(2) may comprise Nx secondary circuit modules S(1, 2), . . . , and S(Nx, 2), . . . , and the circuit module PS2D(Ny) may comprise Nx secondary circuit modules S(1, Ny), . . . , and S(Nx, Ny). In the circuit module PS2D(ny), any secondary circuit module S(nx, ny) of the secondary circuit modules S(1, ny), . . . , and S(Nx, ny) may comprise Nz memory cells M(nx, ny, 1), M(nx, ny, 2), . . . , and M(nx, ny, Nz), and may comprise a set of selector circuits corresponding to the memory cells M(nx, ny, 1), M(nx, ny, 2), . . . , and M(nx, ny, Nz), such as the upper selector circuit MBLS(nx, ny) and the lower selector circuit MSLS(nx, ny), where "nx" may represent any integer in the interval [1, Nx]. The upper selector circuit MBLS(nx, ny) and the lower selector circuit MSLS(nx, ny) and the memory cells M(nx, ny, 1), M(nx, ny, 2), . . . , and M(nx, ny, Nz) may be implemented with transistors. For example, the upper selector circuit MBLS(nx, ny) and the lower selector circuit MSLS(nx, ny) may be implemented with ordinary transistors without any floating gate, and any memory cell M(nx, ny, nz) of the memory cells M(nx, ny, 1), M(nx, ny, 2), . . . , and M(nx, ny, Nz) may be implemented with a floating gate transistor, where "nz" may represent any integer in the interval [1, Nz], but the present invention is not limited thereto. Further, the upper selector circuits MBLS(1, ny), . . . , and MBLS(Nx, ny) in the circuit module PS2D(ny) may perform selection according to the selection signal on the corresponding selection line BLS(ny), and the lower selector circuits MSLS(1, ny), . . . , and MSLS(Nx, ny) in the circuit module PS2D(ny) may perform selection according to the selection signal on the corresponding selection line SLS(ny).

Figure 3:
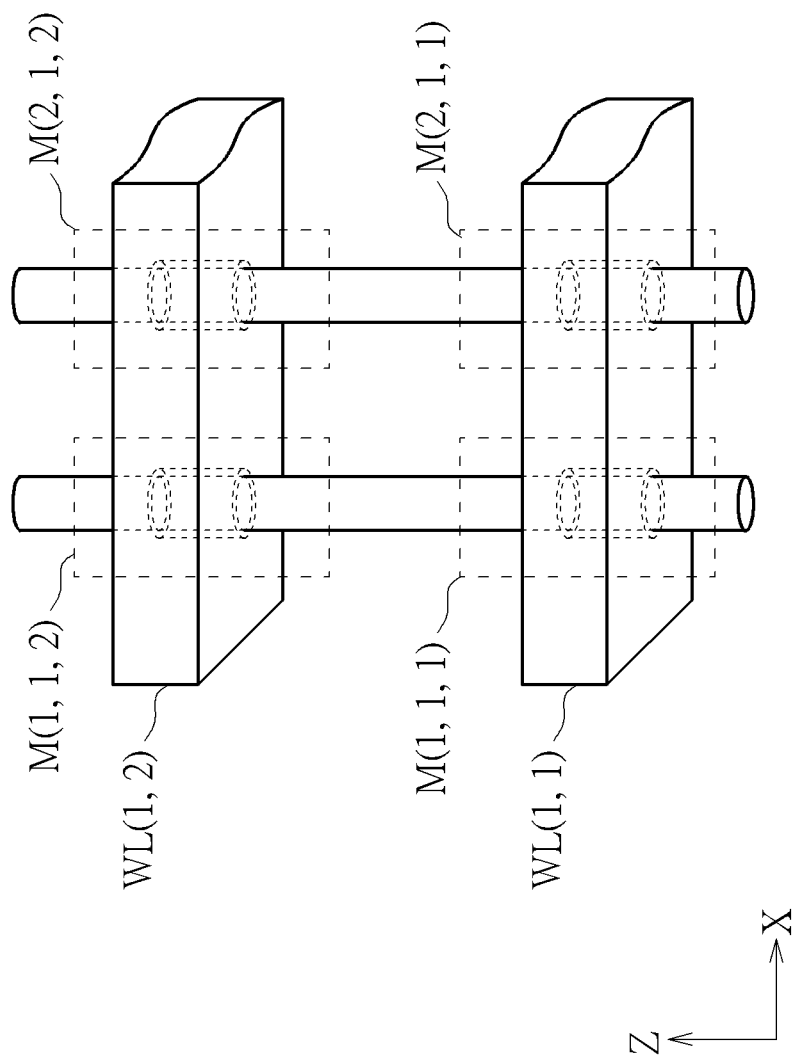
FIG. 3 illustrates some partial structures of the 3D NAND flash memory shown in FIG. 2 according to an embodiment of the present invention.

FIG. 3 illustrates some partial structures of the 3D NAND flash memory shown in FIG. 2 according to an embodiment of the present invention. The 3D NAND flash memory may be designed to have a plurality of rod-shaped partial structures such as that shown in FIG. 3, and the plurality of rod-shaped partial structures may be arranged to pass through the secondary circuit modules {S(1, 1), . . . , S(Nx, 1)}, {S(1, 2), . . . , S(Nx, 2)}, . . . , and {S(1, Ny), . . . , S(Nx, Ny)}, respectively. For better comprehension, the plurality of rod-shaped partial structures may be regarded as the channels of the associated transistors of the secondary circuit modules {S(1, 1), . . . , S(Nx, 1)}, {S(1, 2), . . . , S(Nx, 2)}, . . . , and {S(1, Ny), . . . , S(Nx, Ny)} within the architecture shown in FIG. 2, respectively, such as the channels of the ordinary transistors for implementing the upper selector circuit MBLS(nx, ny) and the lower selector circuit MSLS(nx, ny) and the channel of the floating gate transistor for implementing the memory cell M(nx, ny, nz). According to some embodiments, the number of the plurality of rod-shaped partial structures may be equal to the total amount (Nx*Ny) of the secondary circuit modules {S(1, 1), . . . , S(Nx, 1)}, {S(1, 2), . . . , S(Nx, 2)}, . . . , and {S(1, Ny), . . . , S(Nx, Ny)}, but the present invention is not limited thereto. For example, the arrangement of the plurality of memory cells may be changed, and the number of the plurality of rod-shaped partial structures may be changed correspondingly.

In addition, the 3D NAND flash memory may be designed to have a plurality of pipe-shaped partial structures, and the plurality of pipe-shaped partial structures may be arranged to encircle the plurality of rod-shaped partial structures to form the respective components of the secondary circuit modules {S(1, 1), . . . , S(Nx, 1)}, {S(1, 2), . . . , S(Nx, 2)}, . . . , and {S(1, Ny), . . . , S(Nx, Ny)}, and more particularly, to form the respective control gates and the respective floating gates of the plurality of memory cells and the respective gates of the plurality of selector circuits in the architecture shown in FIG. 2. The memory cells {{M(1, 1, 1), M(2, 1, 1), . . . }, {M(1, 1, 2), M(2, 1, 2), . . . }, . . . } and the word lines {WL(1, 1), WL(1, 2), . . . } are illustrated in FIG. 3, and the pipe-shaped partial structures shown in FIG. 3 may indicate that there are some additional partial structures surrounding each of the plurality of rod-shaped partial structures, where further details regarding the additional partial structures will be described in the following embodiments.

Figure 4:
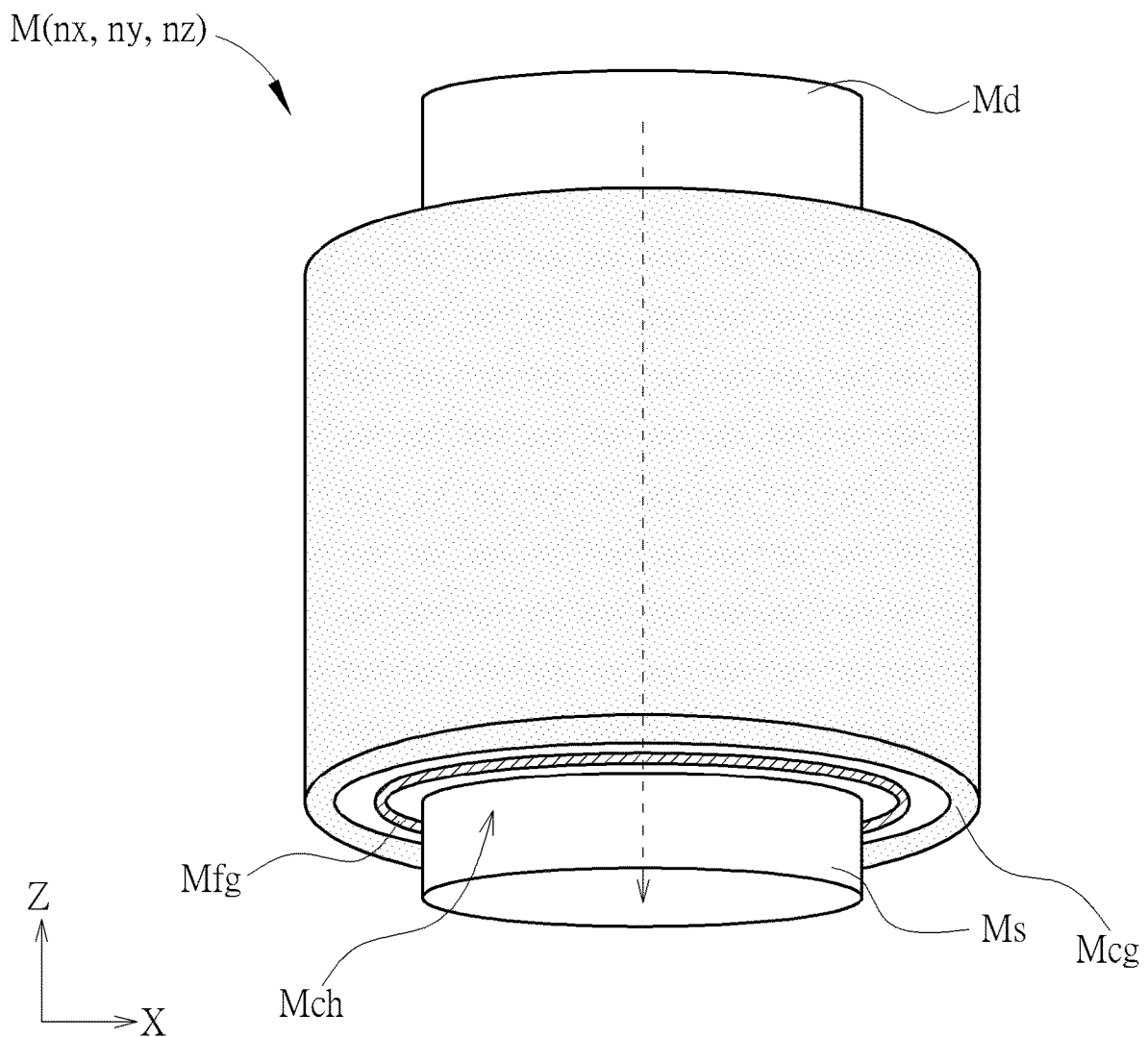
FIG. 4 illustrates some implementation details of one of the memory cells of the 3D NAND flash memory shown in FIG. 2 according to an embodiment of the present invention.

FIG. 4 illustrates some implementation details of one of the memory cells of the 3D NAND flash memory shown in FIG. 2 according to an embodiment of the present invention. As shown in FIG. 4, the memory cell M(nx, ny, nz) may comprise a portion of one of the plurality of rod-shaped partial structures, such as a rod segment within the rod-shaped partial structure corresponding to the secondary circuit module S(nx, ny), and may further comprise some pipe-shaped partial structures having the same symmetry axis. For example, the upper side Md and the lower side Ms of the rod segment may be utilized as the drain and the source of the floating gate transistor for implementing the memory cell M(nx, ny, nz), and a first pipe-shaped partial structure Mfg and a second pipe-shaped partial structure Mcg within these pipe-shaped partial structures may be utilized as the floating gate and the control gate of this floating gate transistor. The other pipe-shaped partial structures within these pipe-shaped partial structures, such as the pipe-shaped partial structure between the rod segment and the first pipe-shaped partial structure Mfg and the pipe-shaped partial structure between the first pipe-shaped partial structure Mfg and the second pipe-shaped partial structure Mcg, may be implemented with one or more insulation materials.

According to some embodiments, any selector circuit of the plurality of selector circuits in the architecture shown in FIG. 2 may be implemented by changing the architecture shown in FIG. 4. For example, the upper side Md and the lower side Ms of the rod segment may be utilized as the drain and the source of the ordinary transistor for implementing this selector circuit, and the second pipe-shaped partial structure Mcg within these pipe-shaped partial structures may be utilized as the gate of the ordinary transistor, where the first pipe-shaped partial structure Mfg should be removed from the one or more insulation materials. As a result, there may be only one pipe-shaped partial structure between the rod segment and the second pipe-shaped partial structure Mcg, but the present invention is not limited thereto.

Figure 5:
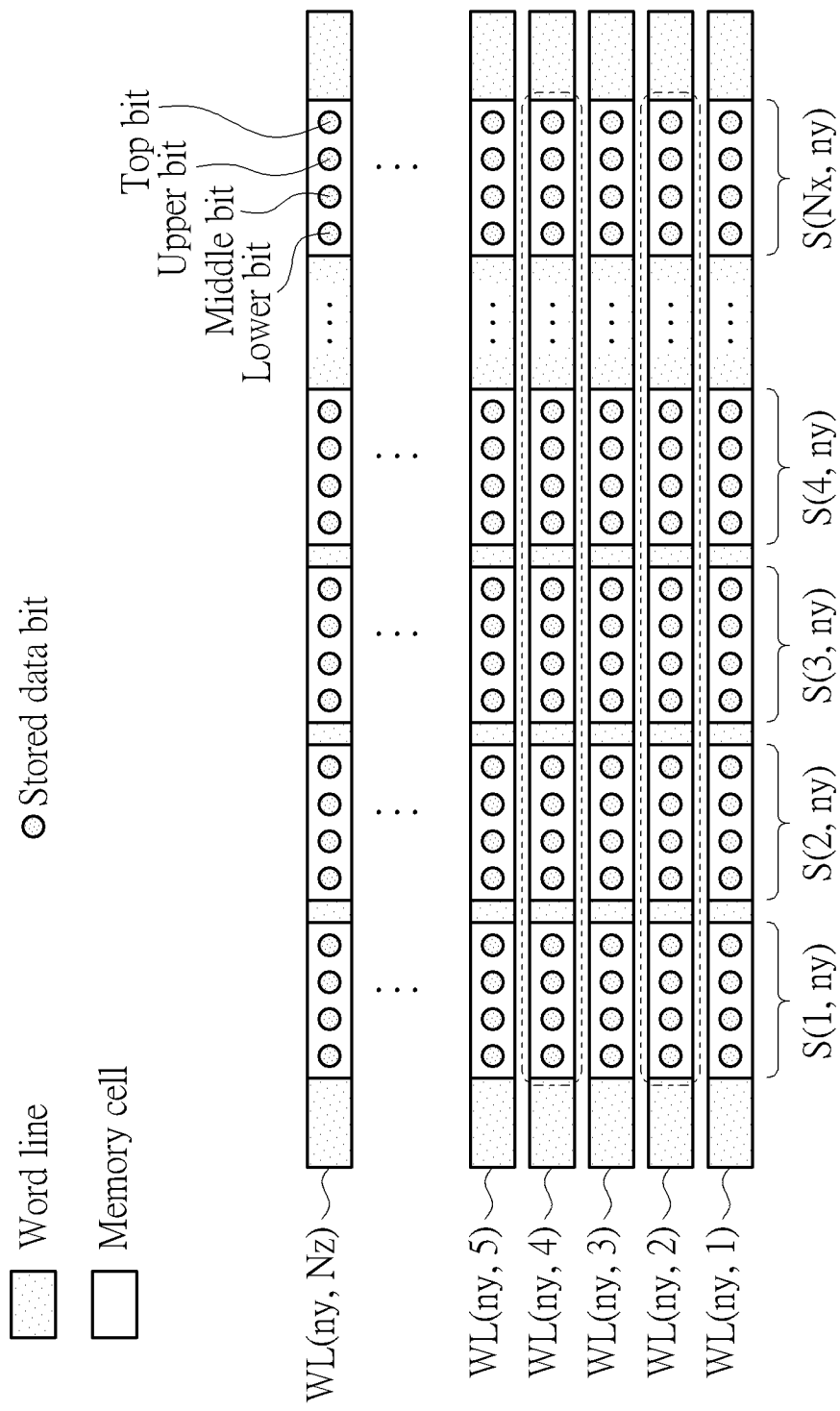
FIG. 5 illustrates a storage control scheme of a method for performing data management of a memory device with aid of targeted protection control according to an embodiment of the present invention.

FIG. 5 illustrates a storage control scheme of a method for performing data management of a memory device such as the memory device 100 shown in FIG. 1 with aid of targeted protection control according to an embodiment of the present invention. For example, the physical blocks for storing data within a data region of the NV memory 120 may be QLC blocks, and the number of programming states may be equal to sixteen (e.g., $2^4=16$), but the present invention is not limited thereto.

For better comprehension, assume that the aforementioned any circuit module PS2D(ny) of the circuit modules PS2D(1), PS2D(2), . . . , and PS2D(Ny) may be arranged to store data, such as at least one portion (e.g., a portion or all) of the randomized data generated in the write procedure mentioned above. In this situation, any memory cell M(nx, ny, nz) among the respective memory cells of the secondary circuit modules {S(1, ny), S(2, ny), S(3, ny), S(4, ny), . . .

, S(Nx, ny)} within the aforementioned any circuit module PS2D(ny) may be arranged to store four data bits (labeled "Stored data bit" for brevity). As any bit of the four data bits may be equal to one of two possible logic values (e.g., the logic values "0" and "1"), sixteen possible combinations {0000, 0001, 0010, 0011, 0100, 0101, 0110, 0111, 1000, 1001, 1010, 1011, 1100, 1101, 1110, 1111} of the four data bits may be expressed with the sixteen programming states, respectively. In addition, the four data bits of the any memory cell M(nx, ny, nz) among the respective memory cells of the secondary circuit modules {S(1, ny), S(2, ny), S(3, ny), S(4, ny), . . . , S(Nx, ny)}, such as that of the memory cell shown in the upper right of FIG. 5, may be regarded as a lower bit, a middle bit, an upper bit and a top bit respectively corresponding to a lower page, a middle page, an upper page and a top page, and more particularly, belong to different pages such as the lower page, the middle page, the upper page and the top page, respectively. For example, a set of memory cells connected to a certain word line (e.g., any word line WL(ny, nz) among the word lines {WL(ny, 1), WL(ny, 2), WL(ny, 3), WL(ny, 4), WL(ny, 5), . . . , WL(ny, Nz)}) may be accessed when this word line enables the access of the set of memory cells, and the lower bits, the middle bits, the upper bits and the top bits stored in the set of memory cells may belong to the lower page, the middle page, the upper page and the top page accessed by the same word line (e.g., the any word line WL(ny, nz) mentioned above), respectively, but the present invention is not limited thereto.

According to some embodiments, the type of physical blocks for storing data within the data region of the NV memory 120 may vary. For example, the physical blocks within the data region may represent triple level cell (TLC) blocks, and the number of programming states may become eight (e.g., $2^3=8$). For another example, the physical blocks within the data region may represent single level cell (SLC) blocks, and the number of programming states may become two (e.g., $2^1=2$). In some examples, the physical blocks within the data region may represent multiple level cell (MLC) blocks, and the number of programming states may become four for a narrow definition of MLC (e.g., two bits per memory cell), or may be at least four for a broad definition of MLC (e.g., at least two bits per memory cell). For brevity, similar descriptions for these embodiments are not repeated in detail here.

Figure 6:
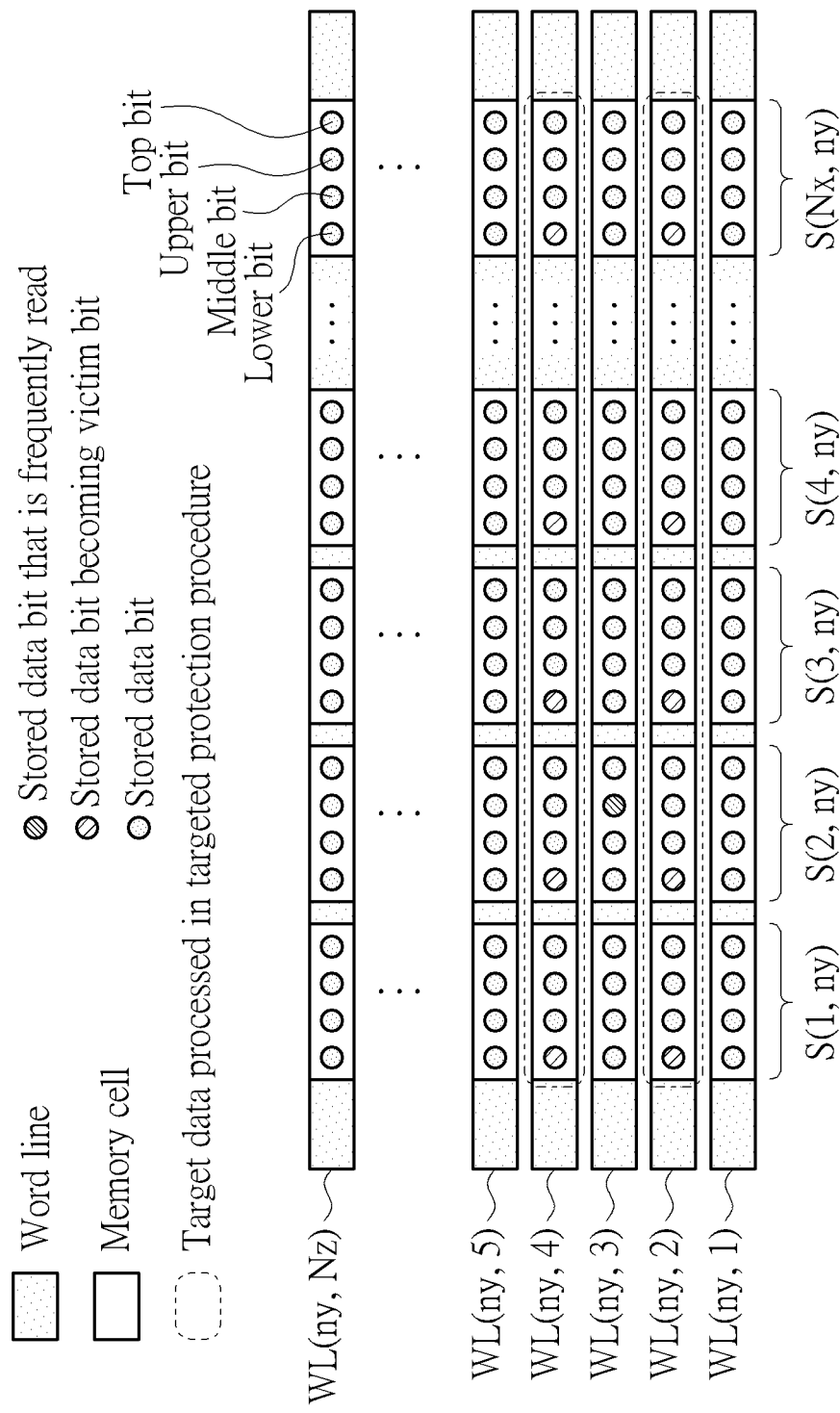
FIG. 6 illustrates a targeted protection control scheme of the method according to an embodiment of the present invention.

FIG. 6 illustrates a targeted protection control scheme of the method according to an embodiment of the present invention, where the physical blocks within the data region of the NV memory 120 may be QLC blocks, and the number of programming states may be equal to sixteen, but the present invention is not limited thereto. The method can be applied to the memory device 100 shown in FIG. 1, and more particularly, can be applied to the memory controller 110 and the internal components thereof. For example, the memory device 100 (e.g., the memory controller 110) can perform the following operations:

(1) the memory controller 110 can receive a first host command such as the host command CMD_H(0) (e.g., a host read command) from the host device 50, where the first host command such as the host command CMD_H(0) may indicate that reading stored data DATA(1) is requested, for example, the stored data DATA(1) is stored at a location LOC(1) within the NV memory 120, such as the location of the memory cells accessed by the word line WL(ny, 3);

(2) in response to the first host command such as the host command CMD_H(0), the memory controller 110 can send a first operating command such as the operating command CMD_OP(0) (e.g., a read command) to the NV memory 120 to read the stored data DATA(1) from the location LOC(1) within the NV memory 120, for being returned to the host device 50;

(3) the memory controller 110 can monitor a read count RCNT(1) of the location LOC(1) to determine whether the read count RCNT(1) of the location LOC(1) reaches a read count threshold RCNT_Th, where the read count RCNT(1) of the location LOC(1) can be recorded in the read count table 120R within the NV memory 120;

(4) when the read count RCNT(1) of the location LOC(1) reaches the read count threshold RCNT_Th, the memory controller 110 can monitor at least one error bit count (e.g., one or more error bit counts) of other stored data of at least one other location (e.g., one or more other locations) within the NV memory 120, such as the error bit count ECNT(j) of the location LOC(j) (e.g., j≠1) which is different from the location LOC(1), to determine whether the aforementioned at least one error bit count reaches an error bit count threshold ECNT_Th, where the aforementioned at least one other location may comprise a location LOC(2) within the NV memory 120, and the other stored data may comprise stored data DATA(2), for example, the stored data DATA(2) is stored at the location LOC(2), such as the location of the memory cells accessed by the word line WL(ny, 4); and (5) when the aforementioned at least one error bit count such as the error bit count ECNT(j) reaches the error bit count threshold ECNT_Th, the memory controller 110 can start a targeted protection procedure to process the stored data DATA(2), for preventing the stored data DATA(2) from being damaged by at least one reading behavior (e.g., one or more reading behaviors) of the host device 50;

where the aforementioned at least one reading behavior of the host device 50 may comprise sending the first host command such as the host command CMD_H(0) for reading the stored data DATA(1), but the present invention is not limited thereto. In some examples, the read count RCNT(1) of the location LOC(1) can be updated in response to the aforementioned at least one reading behavior of the host device 50, and the memory device 100 (e.g., the memory controller 110) can further perform the following operations:

(1) the memory controller 110 can receive a plurality of second host commands such as the host commands CMD_H(1), CMD_H(2), etc. (e.g., multiple host read commands that are equivalent to the host read command mentioned above) from the host device 50, where each second host command among the plurality of second host commands, such as any of the host commands CMD_H(1), CMD_H(2), etc., may indicate that reading the stored data DATA(1) is requested; and (2) in response to the plurality of second host commands such as the host commands CMD_H(1), CMD_H(2), etc., the memory controller 110 can send a plurality of second operating commands such as the operating commands CMD_OP(1), CMD_OP(2), etc. (e.g., multiple read commands that are equivalent to the read command mentioned above) to the NV memory 120 to read the stored data DATA(1) from the location LOC(1) within the NV memory 120, respectively, for being returned to the host device 50, respectively;

where the aforementioned at least one reading behavior of the host device 50 may further comprise sending the plurality of second host commands such as the host commands CMD_H(1), CMD_H(2), etc. for reading the stored data DATA(1) multiple times. For example, in response to the aforementioned at least one reading behavior of the host device 50, the read count RCNT(1) of the location LOC(1) may reach the read count threshold RCNT_Th.

According to this embodiment, the aforementioned at least one other location may further comprise a location LOC(3) within the NV memory 120, and the other stored data may further comprise stored data DATA(3), for example, the stored data DATA(3) is stored at the location DATA(3), such as the location of the memory cells accessed by the word line WL(ny, 2). In addition, regarding starting the targeted protection procedure to process the stored data DATA(2) for preventing the stored data DATA(2) from being damaged by the aforementioned at least one reading behavior of the host device 50, the memory controller 110 can process the stored data of more than one location. More particularly, in response to the aforementioned at least one error bit count such as the error bit count ECNT(j) reaching the error bit count threshold ECNT_Th, the memory controller 110 can start the targeted protection procedure to process both of the stored data DATA(2) and the stored data DATA(3), for preventing both of the stored data DATA(2) and the stored data DATA(3) from being damaged by the aforementioned at least one reading behavior of the host device 50.

For better comprehension, assume that among the four data bits that are stored in a certain memory cell (e.g., the memory cell corresponding to the secondary circuit module S(2, ny)) among the memory cells accessed by the word line WL(ny, 3), a certain stored data bit (e.g., the upper bit) is an important data bit and is frequently read by the host device 50 (labeled "Stored data bit that is frequently read" for brevity). For example, the memory device 100 such as the SSD may be used as a system disk, and the important data bit may represent a flag or a certain setting in a system file and therefore may be frequently read by the host device 50. The aforementioned at least one reading behavior of the host device 50, such as frequently reading the important data bit at the location LOC(1) (e.g., the location of the memory cells accessed by the word line WL(ny, 3)), may make some bits at the neighboring locations LOC(2) and LOC(3) (e.g., the locations that are adjacent to the location LOC(1), such as the location of the memory cells accessed by the word line WL(ny, 4) and the location of the memory cells accessed by the word line WL(ny, 2)) be changed and become victim bit (labeled "Stored data bit becoming victim bit" for brevity). The memory controller 110 can operate according to the targeted protection control scheme to prevent any data error of the memory device 100, and more particularly, can start the targeted protection procedure to process both of the stored data DATA(2) and the stored data DATA(3), for preventing both of the stored data DATA(2) and the stored data DATA(3) from being damaged by the aforementioned at least one reading behavior of the host device 50.

In the embodiment shown in FIG. 6, the location of the memory cells accessed by the word line WL(ny, 3) can be taken as an example of the location LOC(1), and the location of the memory cells accessed by the word line WL(ny, 4) and the location of the memory cells accessed by the word line WL(ny, 2) can be taken as examples of the neighboring locations LOC(2) and LOC(3), respectively, but the present invention is not limited thereto. According to some embodiments, the location LOC(1) may vary, and the neighboring locations LOC(2) and LOC(3) may vary correspondingly. For example, within a certain NV memory element among the aforementioned at least one NV memory element (e.g., the one or more NV memory elements), such as the aforementioned any NV memory element 122-$n$ among the NV memory elements 122-1, 122-2, . . . , and 122-$N_E$, both of the locations LOC(2) and LOC(3) may be adjacent to the location LOC(1). For another example, within a certain NV memory element among the aforementioned at least one NV memory element (e.g., the one or more NV memory elements), such as the aforementioned any NV memory element 122-$n$ among the NV memory elements 122-1, 122-2, . . . , and 122-$N_E$, the location LOC(1) may correspond to a set of first memory cells that are accessed through a first word line (e.g., the word line WL(ny, nz)), the location LOC(2) may correspond to a set of second memory cells that are accessed through a second word line (e.g., one word line among the two neighboring word lines WL(ny, nz+1) and WL(ny, nz−1)), and the location LOC(3) may correspond to a set of third memory cells that are accessed through a third word line (e.g., the other word line among the two neighboring word lines WL(ny, nz+1) and WL(ny, nz−1)), where among all word lines within this NV memory element (e.g., the NV memory element 122-$n$), the first word line (e.g., the word line WL(ny, nz)) and the second word line (e.g., the one word line among the two neighboring word lines WL(ny, nz+1) and WL(ny, nz−1)) are adjacent to each other, and the first word line (e.g., the word line WL(ny, nz)) and the third word line (e.g., the other word line among the two neighboring word lines WL(ny, nz+1) and WL(ny, nz−1)) are adjacent to each other. For brevity, similar descriptions for these embodiments are not repeated in detail here.

According to some embodiments, within the aforementioned certain NV memory element among the aforementioned at least one NV memory element (e.g., the one or more NV memory elements), such as the aforementioned any NV memory element 122-$n$ among the NV memory elements 122-1, 122-2, . . . , and 122-$N_E$, the location LOC(1) may be a boundary location, and more particularly, may be the location of a boundary of all memory cells in the aforementioned any circuit module PS2D(ny). In this situation, for the location LOC(1) such as the location of the memory cells accessed by the word line WL(ny, nz), there may be a single neighboring location LOC(j) (e.g., the location {LOC(j)|j=2}), rather than multiple neighboring locations {LOC(j)}(e.g., the locations {LOC(j)|j=2, 3}). For example, assume that nz=1, and for the location LOC(1) such as the location of the memory cells accessed by the word line WL(ny, 1), the single neighboring location LOC(j) (e.g., the location {LOC(j)|j=2}) may be adjacent to the location LOC(1), and may represent the location of the memory cells accessed by the word line WL(ny, 2). The location LOC(1) may correspond to the set of first memory cells that are accessed through the first word line (e.g., the word line WL(ny, 1)), and the location LOC(2) may correspond to the set of second memory cells that are accessed through the second word line (e.g., the neighboring word line WL(ny, 2)), where among all word lines within this NV memory element (e.g., the NV memory element 122-$n$), the first word line (e.g., the word line WL(ny, 1)) and the second word line (e.g., the neighboring word line WL(ny, 2)) are adjacent to each other. For another example, assume that nz=Nz, and for the location LOC(1) such as the location of the memory cells accessed by the word line WL(ny, Nz), the single neighboring location LOC(j) (e.g., the location {LOC(j)|j=2}) may be adjacent to the location LOC(1), and may represent the location of the memory cells accessed by the word line WL(ny, Nz−1). The location LOC(1) may correspond to the set of first memory cells that are accessed through the first word line (e.g., the word line WL(ny, Nz)), and the location LOC(2) may correspond to the set of second memory cells that are accessed through the second word line (e.g., the neighboring word line WL(ny, Nz−1)), where among all word lines within this NV memory element (e.g., the NV memory element 122-n), the first word line (e.g., the word line WL(ny, Nz)) and the second word line (e.g., the neighboring word line WL(ny, Nz−1)) are adjacent to each other. For brevity, similar descriptions for these embodiments are not repeated in detail here.

Figure 7:
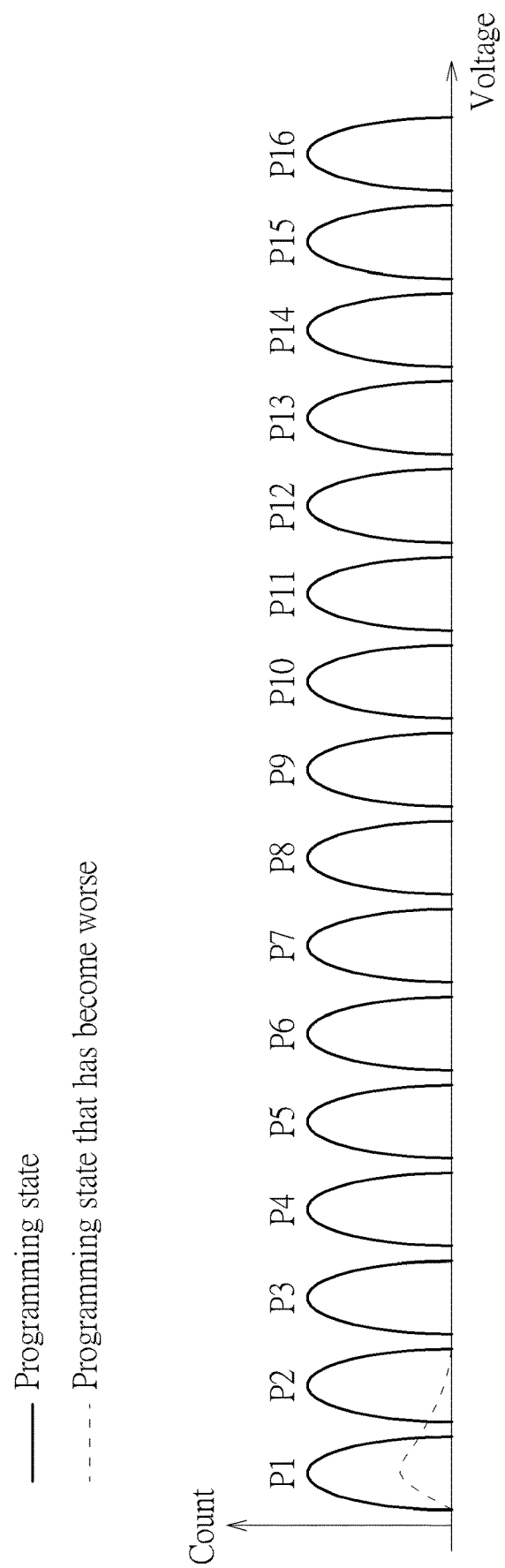
FIG. 7 illustrates an example of a programming state distribution of at least one physical block within a data region of the NV memory in a situation where the storage control scheme shown in FIG. 5 is applied to the memory device shown in FIG. 1, where an example of a programming state distribution of a certain programming state that has become worse with respect to time is also illustrated in the leftmost of FIG. 7 for better comprehension.

FIG. 7 illustrates an example of a programming state distribution of at least one physical block within the data region of the NV memory 120 in a situation where the storage control scheme shown in FIG. 5 is applied to the memory device 100 shown in FIG. 1, where an example of a programming state distribution of a certain programming state that has become worse with respect to time is also illustrated in the leftmost of FIG. 7 for better comprehension. For example, the aforementioned at least one physical block within the data region of the NV memory 120 may represent at least one QLC block (e.g., one or more QLC blocks), and the number of programming states may be equal to sixteen, but the present invention is not limited thereto. In addition, in the programming state distribution of the programming states P1, P2, P3, P4, P5, P6, P7, P8, P9, P10, P11, P12, P13, P14, P15 and P16, the horizontal axis may represent the voltage such as a threshold voltage for sensing bit information in a memory cell, and the vertical axis may represent the count such as the memory cell count of all memory cells in the aforementioned at least one physical block (e.g., the aforementioned at least one QLC block).

As shown in the upper half of FIG. 5, the programming states P1, P2, P3, P4, P5, P6, P7, P8, P9, P10, P11, P12, P13, P14, P15 and P16 in the aforementioned at least one QLC block can be very uniform, where the seeds used by the randomizer circuit 114R (e.g., the randomizer therein) can be properly prepared according to at least one predetermined rule in advance, to guarantee the randomness-properties of all data in the aforementioned at least one QLC block, and therefore make the programming states P1, P2, P3, P4, P5, P6, P7, P8, P9, P10, P11, P12, P13, P14, P15 and P16 in the aforementioned at least one QLC block be very uniform. As time goes by, the programming state P1 may have become worse, and the programming state distribution of the programming state P1 may look like a collapse version of the original programming state distribution of the programming state P1. As a result, at least the first two programming states (e.g., the programming states P1 and P2) may become undistinguishable, and the undistinguishable programming states problem may cause data errors. The memory controller 110 can operate according to at least one control scheme (e.g., one or more control schemes) of the method, such as the targeted protection control scheme shown in FIG. 6, etc., to prevent any data error of the memory device 100 due to the undistinguishable programming states problem.

Figure 8:
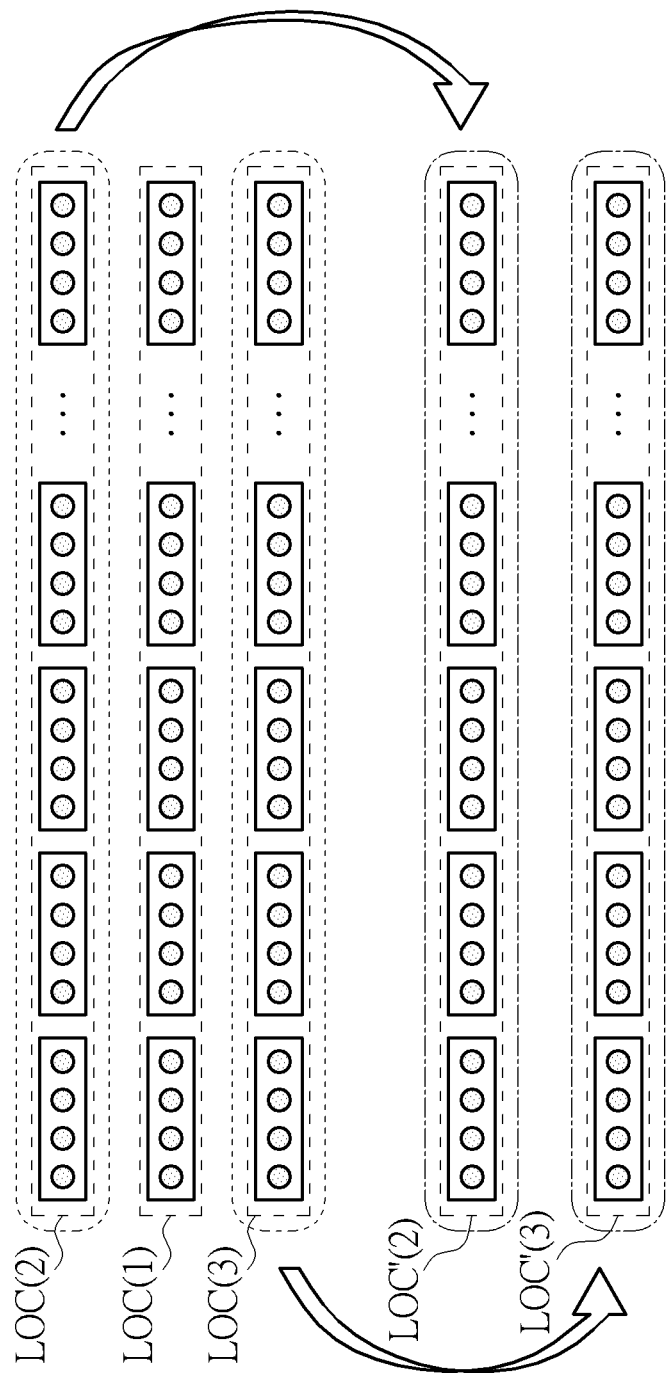
FIG. 8 illustrates a storing-and-remapping-based targeted protection control scheme of the method according to an embodiment of the present invention.

FIG. 8 illustrates a storing-and-remapping-based targeted protection control scheme of the method according to an embodiment of the present invention, where the physical blocks within the data region of the NV memory 120 may be QLC blocks, and the number of programming states may be equal to sixteen, but the present invention is not limited thereto. For example, during the targeted protection procedure, processing the stored data DATA(2) may comprise the following operations:

(1) the memory controller 110 can read the stored data DATA(2) from the location LOC(2), where the upper set of target data among the two sets of target data processed in the targeted protection procedure as shown in FIG. 8 can be taken as an example of the stored data DATA(2) being read from the location LOC(2), and the location at which the upper set of target data is stored can be taken as an example of the location LOC(2); and (2) the memory controller 110 can store the stored data DATA(2) read from the location LOC(2) at another location LOC'(2) within the NV memory 120, for preventing the stored data DATA(2) stored at the other location LOC'(2) from being damaged by the aforementioned at least one reading behavior of the host device 50, to allow the stored data DATA(2) stored at the location LOC(2) to be damaged by the aforementioned at least one reading behavior of the host device 50, where the upper set of latest stored data among the two sets of latest stored data generated in the targeted protection procedure as shown in FIG. 8 can be taken as an example of the stored data DATA(2) stored at the other location LOC'(2), and the location at which the upper set of latest stored data is stored can be taken as an example of the other location LOC'(2);

where the memory cell count of the memory cells at the other location LOC'(2) may be equal to the memory cell count of the memory cells at the location LOC(2), but the present invention is not limited thereto. For another example, during the targeted protection procedure, processing the stored data DATA(3) may comprise the following operations:

(1) the memory controller 110 can read the stored data DATA(3) from the location LOC(3), where the lower set of target data among the two sets of target data processed in the targeted protection procedure as shown in FIG. 8 can be taken as an example of the stored data DATA(3) being read from the location LOC(3), and the location at which the lower set of target data is stored can be taken as an example of the location LOC(3); and (2) the memory controller 110 can store the stored data DATA(3) read from the location LOC(3) at another location LOC'(3) within the NV memory 120, for preventing the stored data DATA(3) stored at the other location LOC'(3) from being damaged by the aforementioned at least one reading behavior of the host device 50, to allow the stored data DATA(3) stored at the location LOC(3) to be damaged by the aforementioned at least one reading behavior of the host device 50, where the lower set of latest stored data among the two sets of latest stored data generated in the targeted protection procedure as shown in FIG. 8 can be taken as an example of the stored data DATA(3) stored at the other location LOC'(3), and the location at which the lower set of latest stored data is stored can be taken as an example of the other location LOC'(3);

where the memory cell count of the memory cells at the other location LOC'(3) may be equal to the memory cell count of the memory cells at the location LOC(3), but the present invention is not limited thereto.

In addition, during the targeted protection procedure, the memory controller 110 can update at least one address mapping table (e.g., one or more address mapping tables)

within the NV memory 120, such as the global L2P address mapping table 120T and/or the local L2P address mapping table therein, to complete the processing of the stored data DATA(2) and the stored data DATA(3). For example, during the targeted protection procedure, processing the stored data DATA(2) may further comprise the following operation:

(1) after the stored data DATA(2) read from the location LOC(2) is stored at the other location LOC'(2), the memory controller 110 can update the aforementioned at least one address mapping table within the NV memory 120, such as the global L2P address mapping table 120T and/or the local L2P address mapping table therein, to make the stored data DATA(2) stored at the location LOC(2) become invalid data, where updating the aforementioned at least one address mapping table may comprise replacing the location LOC(2) with the other location LOC'(2);

where the aforementioned at least one address mapping table may indicate the other location LOC'(2) as the latest location for storing the stored data DATA(2), but the present invention is not limited thereto. For another example, during the targeted protection procedure, processing the stored data DATA(3) may further comprise the following operation:

(1) after the stored data DATA(3) read from the location LOC(3) is stored at the other location LOC'(3), the memory controller 110 can update the aforementioned at least one address mapping table within the NV memory 120, such as the global L2P address mapping table 120T and/or the local L2P address mapping table therein, to make the stored data DATA(3) stored at the location LOC(3) become invalid data, where updating the aforementioned at least one address mapping table may comprise replacing the location LOC(3) with the other location LOC'(3);

where the aforementioned at least one address mapping table may indicate the other location LOC'(3) as the latest location for storing the stored data DATA(3), but the present invention is not limited thereto. For brevity, similar descriptions for this embodiment are not repeated in detail here.

According to some embodiments, the location at which a set of stored data is stored, such as any location among the locations LOC(1), LOC(2), LOC(3), LOC'(2) and LOC'(3), can be a physical address such as a combination of a physical block address (PBA) and a physical page address (PPA). For example, any host command among the host commands CMD_H(0), CMD_H(1), CMD_H(2), etc. may carry a first logical address such as a combination of a first logical block address (LBA) and a first logical page address (LPA) for indicating that reading the stored data DATA(1) at the first logical address (e.g., the combination of the first LBA and the first LPA) is requested. More particularly, during a write procedure such as that mentioned above, the memory controller 110 may have stored the stored data DATA(1) at the location LOC(1) such as a first physical address (e.g., a combination of a first PBA and a first PPA), and may have further recorded a first address mapping relationship between the first logical address (e.g., the combination of the first LBA and the first LPA) and the first physical address (e.g., the combination of the first PBA and the first PPA) in the global L2P address mapping table 120T (e.g., the local L2P address mapping table therein). Therefore, the memory controller 110 can perform address mapping on the first physical address according to the first address mapping relationship to determine the first physical address to be the location LOC(1).

TABLE 1

| LPA | PBA | PPA |
|---|---|---|
| 0 | PBA(0) | PPA(0) |
| 1 | PBA(1) | PPA(1) |
| 2 | PBA(2) | PPA(2) |
| 3 | PBA(3) | PPA(3) |
| ... | ... | ... |

Table 1 illustrates an example of a first local L2P address mapping table (e.g., any local L2P address mapping table among the plurality of local L2P address mapping tables) within the global L2P address mapping table 120T, where the symbol " . . . " may indicate that some table contents of the first local L2P address mapping table are omitted, but the present invention is not limited thereto. As the first local L2P address mapping table may have been associated with a certain LBA LBA1 (e.g., the first LBA) among all possible LBAs {0, 1, . . . }, it is unnecessary for the memory controller 110 to record any LBA in the first local L2P address mapping table. In addition, the memory controller 110 can record multiple physical addresses {{PBA(0), PPA(0)}, {PBA(1), PPA(1)}, {PBA(2), PPA(2)}, {PBA(3), PPA(3)}, . . . } associated with the LPAs {0, 1, 2, 3, . . . } (e.g., the respective combinations of the PBAs {PBA(0), PBA(1), PBA(2), PBA(3), . . . } and the PPAs {PPA(0), PPA(1), PPA(2), PPA(3), . . . }), for indicating multiple address mapping relationships between multiple logical addresses {{LBA1, 0}, {LBA1, 1}, {LBA1, 2}, {LBA1, 3}, . . . } (e.g., the respective combinations of the LBA LBA1 and the LPAs {0, 1, 2, 3, . . . }) and the multiple physical addresses {{PBA(0), PPA(0)}, {PBA(1), PPA(1)}, {PBA(2), PPA(2)}, {PBA(3), PPA(3)}, . . . }, respectively.

TABLE 2

| PBA | PPA |
|---|---|
| PBA(0) | PPA(0) |
| PBA(1) | PPA(1) |
| PBA(2) | PPA(2) |
| PBA(3) | PPA(3) |
| ... | ... |

Table 2 illustrates another example of the first local L2P address mapping table within the global L2P address mapping table 120T, where the symbol " . . . " may indicate that some table contents of the first local L2P address mapping table are omitted, but the present invention is not limited thereto. In comparison with the previous example shown in Table 1, the field "LPA" can be omitted in the example shown in Table 2, since the ranking of the multiple physical addresses {{PBA(0), PPA(0)}, {PBA(1), PPA(1)}, {PBA(2), PPA(2)}, {PBA(3), PPA(3)}, . . . } can be associated with the LPAs {0, 1, 2, 3, . . . } shown in Table 1. For brevity, similar descriptions for this embodiment are not repeated in detail here.

TABLE 3

| PBA | PPA |
|---|---|
| PBA'(0) | PPA'(0) |
| PBA(1) | PPA(1) |
| PBA'(2) | PPA'(2) |
| PBA(3) | PPA(3) |
| ... | ... |

Table 3 illustrates another example of the first local L2P address mapping table within the global L2P address mapping table 120T, where the symbol " . . . " may indicate that some table contents of the first local L2P address mapping table are omitted, but the present invention is not limited thereto. In comparison with the previous example shown in Table 2, the two original physical addresses {PBA(0), PPA(0)} and {PBA(2), PPA(2)} have been updated to become the two latest physical addresses {PBA'(0), PPA'(0)} and {PBA'(2), PPA'(2)}, respectively. For example, during the write procedure, the memory controller 110 can record the location LOC(1) such as the physical address {PBA(1), PPA(1)}, the location LOC(2) such as the physical address {PBA(2), PPA(2)}, and the location LOC(3) such as the physical address {PBA(0), PPA(0)} as shown in Table 2. In addition, during the targeted protection procedure, the memory controller 110 can operate according to the storing-and-remapping-based targeted protection control scheme shown in FIG. 8, and can record the location LOC'(2) such as the physical address {PBA'(2), PPA'(2)} and the location LOC'(3) such as the physical address {PBA'(0), PPA'(0)} as shown in Table 3. For brevity, similar descriptions for this embodiment are not repeated in detail here.

Figure 9:
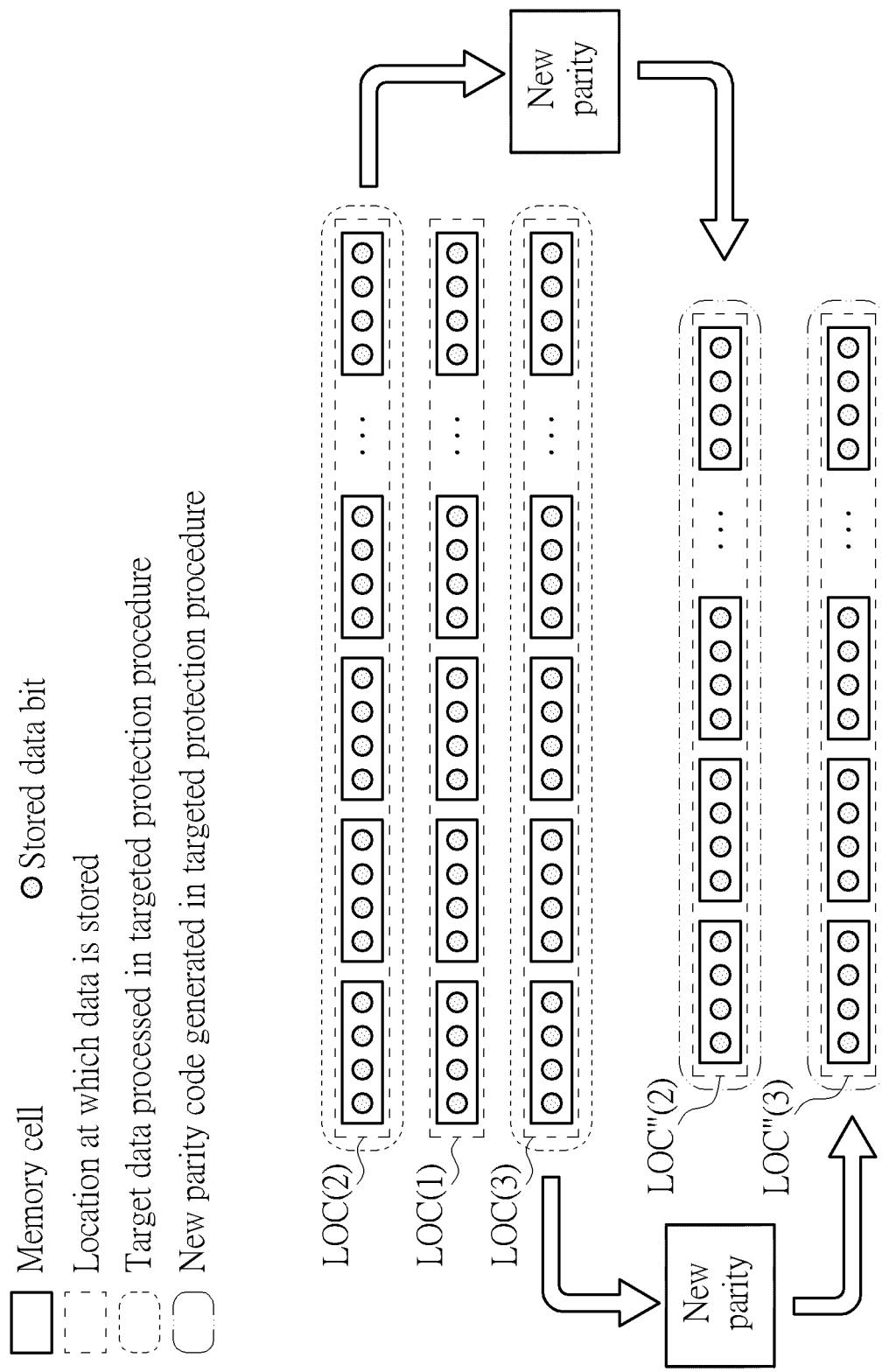
FIG. 9 illustrates a parity-code-regeneration-based targeted protection control scheme of the method according to an embodiment of the present invention.

FIG. 9 illustrates a parity-code-regeneration-based targeted protection control scheme of the method according to an embodiment of the present invention, where the physical blocks within the data region of the NV memory 120 may be QLC blocks, and the number of programming states may be equal to sixteen, but the present invention is not limited thereto. For example, during the targeted protection procedure, processing the stored data DATA(2) may comprise the following operations:

(1) the memory controller 110 can read the stored data DATA(2) from the location LOC(2), where the stored data DATA(2) stored at the location LOC(2) can be protected with a first parity code (e.g., the first parity code can be embedded in the stored data DATA(2) stored at the location LOC(2)), the upper set of target data among the two sets of target data processed in the targeted protection procedure as shown in FIG. 9 can be taken as an example of the stored data DATA(2) being read from the location LOC(2), and the location at which the upper set of target data is stored can be taken as an example of the location LOC(2);

(2) the memory controller 110 can generate a second parity code (labeled "New parity" for brevity) according to the stored data DATA(2) read from the location LOC(2), for example, by utilizing the ECC circuit 114E, and store the second parity code (e.g., a randomized version thereof, such as randomized data generated according to the second parity code by utilizing the randomizer circuit 114R) at another location LOC"(2) within the NV memory 120, where the upper new parity code among the two new parity codes generated in the targeted protection procedure as shown in FIG. 9 can be taken as an example of the second parity code stored at the other location LOC"(2), and the location at which the upper new parity code is stored can be taken as an example of the other location LOC"(2); and (3) the memory controller 110 can record the other location LOC"(2) into at least one table (e.g., one or more tables) within the NV memory 120, such as the global L2P address mapping table 120T and/or the local L2P address mapping table therein, to indicate that the second parity code is stored at the other location LOC"(2), where the stored data DATA(2) stored at the location LOC(2) can be further protected with the second parity code stored at the other location LOC"(2); where the memory cell count of the memory cells at the other location LOC"(2) may be not equal to the memory cell count of the memory cells at the location LOC(2), but the present invention is not limited thereto. For another example, during the targeted protection procedure, processing the stored data DATA(3) may comprise the following operations:

(1) the memory controller 110 can read the stored data DATA(3) from the location LOC(3), where the stored data DATA(3) stored at the location LOC(3) can be protected with a third parity code (e.g., the third parity code can be embedded in the stored data DATA(3) stored at the location LOC(3)), the lower set of target data among the two sets of target data processed in the targeted protection procedure as shown in FIG. 9 can be taken as an example of the stored data DATA(3) being read from the location LOC(3), and the location at which the lower set of target data is stored can be taken as an example of the location LOC(3);

(2) the memory controller 110 can generate a fourth parity code (labeled "New parity" for brevity) according to the stored data DATA(3) read from the location LOC(3), for example, by utilizing the ECC circuit 114E, and store the fourth parity code (e.g., a randomized version thereof, such as randomized data generated according to the fourth parity code by utilizing the randomizer circuit 114R) at another location LOC"(3) within the NV memory 120, where the lower new parity code among the two new parity codes generated in the targeted protection procedure as shown in FIG. 9 can be taken as an example of the fourth parity code stored at the other location LOC"(3), and the location at which the lower new parity code is stored can be taken as an example of the other location LOC"(3); and (3) the memory controller 110 can record the other location LOC"(3) into the aforementioned at least one table within the NV memory 120, such as the global L2P address mapping table 120T and/or the local L2P address mapping table therein, to indicate that the fourth parity code is stored at the other location LOC"(3), where the stored data DATA(3) stored at the location LOC(3) can be further protected with the fourth parity code stored at the other location LOC"(3); where the memory cell count of the memory cells at the other location LOC"(3) may be not equal to the memory cell count of the memory cells at the location LOC(3), but the present invention is not limited thereto. For brevity, similar descriptions for this embodiment are not repeated in detail here.

According to some embodiments, the protection capability of the second parity code can be greater than the protection capability of the first parity code, and the protection capability of the fourth parity code can be greater than the protection capability of the third parity code, where the parity code size of the second parity code can be greater than the parity code size of the first parity code, and the parity code size of the fourth parity code can be greater than the parity code size of the third parity code, but the present invention is not limited thereto. According to some embodiments, the protection capability of the combination of the first parity code and the second parity code can be greater than the protection capability of the first parity code, and the protection capability of the combination of the third parity code and the fourth parity code can be greater than the protection capability of the third parity code. For brevity, similar descriptions for these embodiments are not repeated in detail here.

TABLE 4

| PBA | PPA | PBA | PPA |
|---|---|---|---|
| PBA(0) | PPA(0) | PBA"(0) | PPA"(0) |
| PBA(1) | PPA(1) | | |
| PBA(2) | PPA(2) | PBA"(2) | PPA"(2) |
| PBA(3) | PPA(3) | | |
| ... | ... | | |

Table 4 illustrates another example of the first local L2P address mapping table within the global L2P address mapping table 120T, where the symbol " . . . " may indicate that some table contents of the first local L2P address mapping table are omitted, but the present invention is not limited thereto. In comparison with the aforementioned example shown in Table 2, additional fields "PBA" and "PPA" shown in the right half of Table 4 are added. More particularly, the memory controller 110 can record one or more additional physical addresses (e.g., the physical addresses {PBA"(2), PPA"(2)} and {PBA"(0), PPA"(0)}) for indicating one or more locations at which one or more new parity codes (e.g., the second parity code and the fourth parity code) are stored. As the memory controller 110 can record the one or more additional physical addresses (e.g., the physical addresses {PBA"(2), PPA"(2)} and {PBA"(0), PPA"(0)}) next to one or more original physical addresses (e.g., the physical addresses {PBA(2), PPA(2)} and {PBA(0), PPA(0)}), the one or more additional physical addresses (e.g., the physical addresses {PBA"(2), PPA"(2)} and {PBA"(0), PPA"(0)}) can be associated with one or more corresponding logical addresses (e.g., the logical addresses {LBA1, 2} and {LBA1, 0}). For example, during the write procedure, the memory controller 110 can record the location LOC(1) such as the physical address {PBA(1), PPA(1)}, the location LOC(2) such as the physical address {PBA(2), PPA(2)}, and the location LOC(3) such as the physical address {PBA(0), PPA(0)} as shown in the left half of Table 4. In addition, during the targeted protection procedure, the memory controller 110 can operate according to the parity-code-regeneration-based targeted protection control scheme shown in FIG. 9, and can record the location LOC"(2) such as the physical address {PBA"(2), PPA"(2)} and the location LOC"(3) such as the physical address {PBA"(0), PPA"(0)} as shown in the right half of Table 4. For brevity, similar descriptions for this embodiment are not repeated in detail here.

Figure 10:
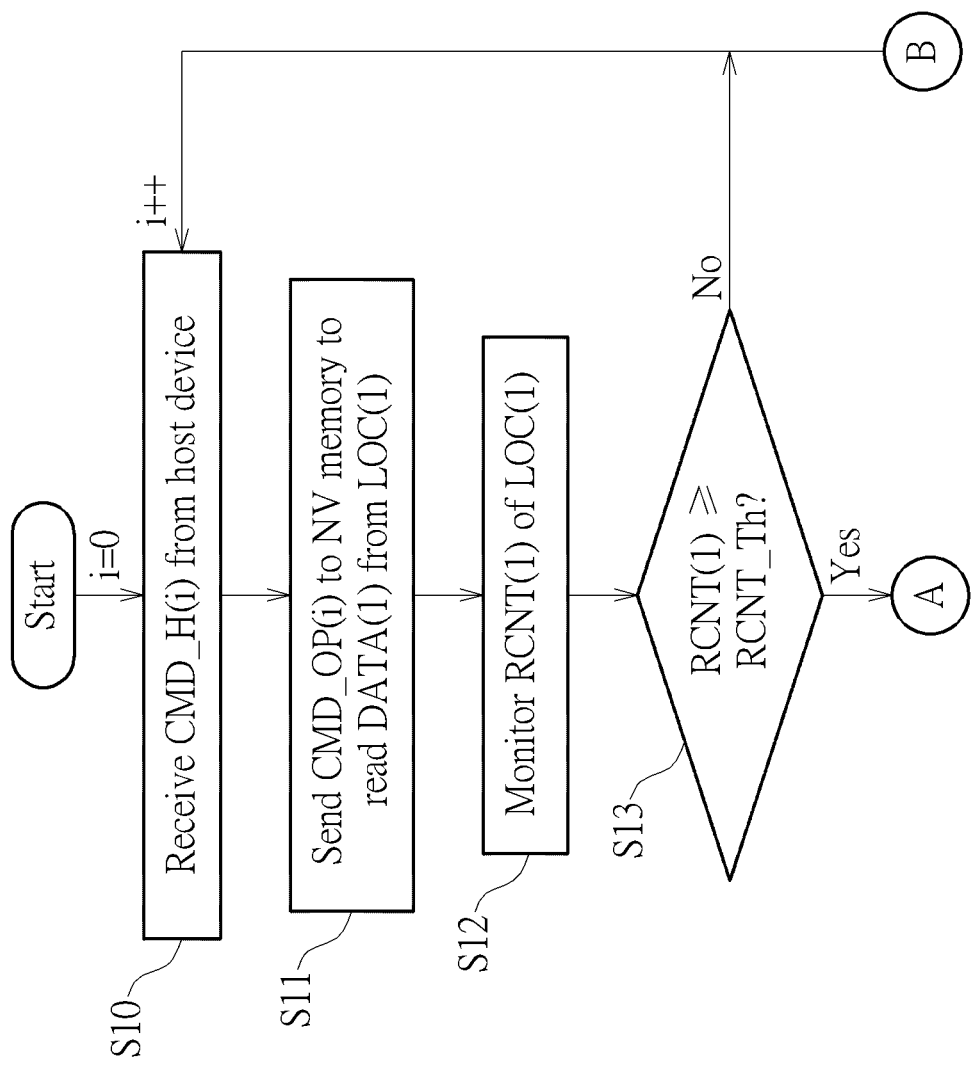
FIG. 10 illustrates a first partial working flow of a working flow of the method according to an embodiment of the present invention.
Figure 11:
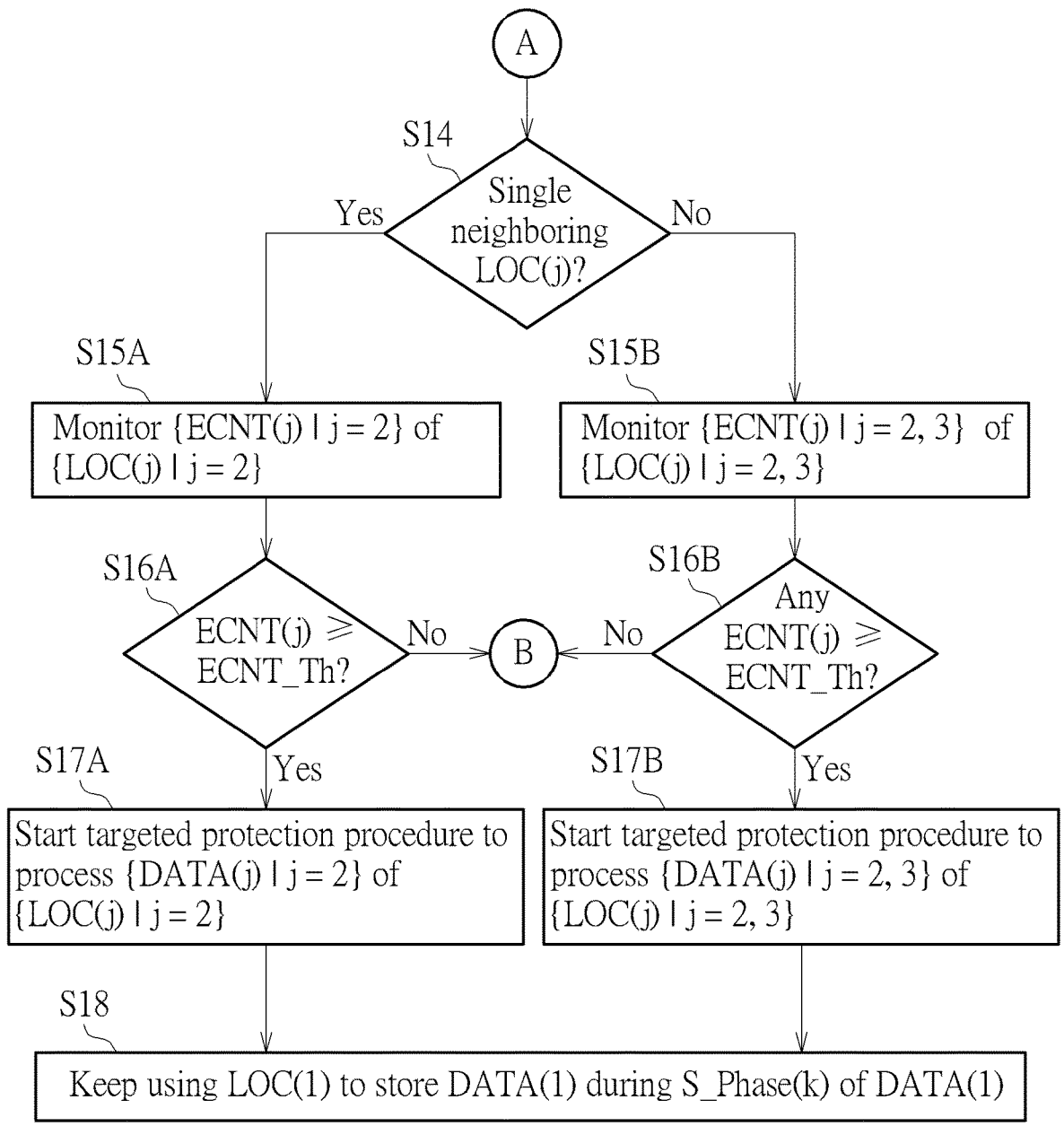
FIG. 11 illustrates a second partial working flow of the working flow of the method according to the embodiment shown in FIG. 10.

FIG. 10 and FIG. 11 respectively illustrate a first partial working flow and a second partial working flow of a working flow of the method according to an embodiment of the present invention, where the nodes A and B may indicate the connections between the first partial working flow (e.g., Steps S10-S13) and the second partial working flow (e.g., Steps S14, S15A, S15B, S16A, S16B, S17A, S17B and S18).

In Step S10, the memory controller 110 can receive the host command CMD_H(i) from the host device 50, where the index i may have an initial value such as zero (labeled "i=0" for brevity), and may increase with a predetermined increment such as one (labeled "i++" for brevity) when Step S10 is re-entered. For example, the memory controller 110 can receive the first host command such as the host command CMD_H(0) (e.g., the host read command mentioned above) from the host device 50 for the first time that Step S10 is entered (e.g., i=0), and can receive the plurality of second host commands such as the host commands CMD_H(1), CMD_H(2), etc. (e.g., the multiple host read commands that are equivalent to the host read command mentioned above) from the host device 50 for the second time, the third time, etc. that Step S10 is entered (e.g., i>0), where any host command CMD_H(i) among the host commands CMD_H(0), CMD_H(1), CMD_H(2), etc. may indicate that reading the stored data DATA(1) is requested, and the stored data DATA(1) is stored at the location LOC(1) within the NV memory 120.

In Step S11, in response to the host command CMD_H(i), the memory controller 110 can send the operating command CMD_OP(i) to the NV memory 120 to read the stored data DATA(1) from the location LOC(1) within the NV memory 120, for being returned to the host device 50. For example, the memory controller 110 can send the first operating command such as the operating command CMD_OP(0) (e.g., the read command mentioned above) to the NV memory 120 to read the stored data DATA(1) from the location LOC(1) within the NV memory 120 for the first time that Step S11 is entered (e.g., i=0), and can send the plurality of second operating commands such as the operating commands CMD_OP(1), CMD_OP(2), etc. (e.g., the multiple read commands that are equivalent to the read command mentioned above) to the NV memory 120 to read the stored data DATA(1) from the location LOC(1) within the NV memory 120 for the second time, the third time, etc. that Step S11 is entered (e.g., i>0), respectively, for being returned to the host device 50, respectively.

In Step S12, the memory controller 110 can monitor the read count RCNT(1) of the location LOC(1), for determining whether the read count RCNT(1) of the location LOC(1) reaches the read count threshold RCNT_Th, where the read count RCNT(1) of the location LOC(1) can be recorded in the read count table 120R within the NV memory 120.

In Step S13, the memory controller 110 can determine whether the read count RCNT(1) of the location LOC(1) reaches the read count threshold RCNT_Th (labeled "RCNT (1)≥RCNT_Th" for brevity). If Yes, Step S14 in the second partial working flow shown in FIG. 11 is entered; if No, Step S10 is entered.

In Step S14, in response to the read count RCNT(1) of the location LOC(1) reaching the read count threshold RCNT_Th, the memory controller 110 can determine whether there is only one neighboring location such as the aforementioned single neighboring location LOC(j) (e.g., the location {LOC(j)| j=2}). If Yes, Step S15A is entered; if No, in a situation where the multiple neighboring locations {LOC(j)} (e.g., the locations {LOC(j)|j=2, 3}) exist, Step S15B is entered.

In Step S15A, the memory controller 110 can monitor the error bit count {ECNT(j)|j=2} of the location {LOC(j)|j=2}, such as the error bit count ECNT(2) of the location LOC(2), for determining whether the error bit count {ECNT(j)|j=2} reaches the error bit count threshold ECNT_Th.

In Step S15B, the memory controller 110 can monitor the error bit counts {ECNT(j)|j=2, 3} of the locations {LOC(j) |j=2, 3}, such as the respective error bit counts ECNT(2) and ECNT(3) of the locations LOC(2) and LOC(3), for determining whether any error bit count ECNT(j) among the error bit counts {ECNT(j)|j=2, 3} reaches the error bit count threshold ECNT_Th.

In Step S16A, the memory controller 110 can determine whether the error bit count ECNT(j) such as the error bit count ECNT(2) reaches the error bit count threshold ECNT_Th (labeled "ECNT(j)≥ECNT_Th" for brevity). If Yes, Step S17A is entered; if No, Step S10 in the first partial working flow shown in FIG. 10 is entered.

In Step S16B, the memory controller 110 can determining whether any error bit count ECNT(j) among the error bit counts {ECNT(j)| j=2, 3} reaches the error bit count threshold ECNT_Th (labeled "Any ECNT(j)≥ECNT_Th" for brevity). If Yes, Step S17B is entered; if No, Step S10 in the first partial working flow shown in FIG. 10 is entered.

In Step S17A, in response to the error bit count ECNT(j) such as the error bit count ECNT(2) reaching the error bit count threshold ECNT_Th, the memory controller 110 can start the targeted protection procedure to process the stored data {DATA(2)|j=2} of the location {LOC(j)|j=2}, such as the stored data DATA(2) of the location LOC(2), for preventing the stored data {DATA(2)|j=2} from being damaged by the aforementioned at least one reading behavior of the host device 50, where the aforementioned at least one reading behavior of the host device 50 may comprise sending the host commands {CMD_H(i)} for reading the stored data DATA(1) of the location LOC(1).

In Step S17B, in response to the any error bit count ECNT(j) among the error bit counts {ECNT(j)|j=2, 3} reaching the error bit count threshold ECNT_Th, the memory controller 110 can start the targeted protection procedure to process all of the stored data {DATA(j)|j=2, 3} of the locations {LOC(j)|j=2, 3}, such as the respective stored data DATA(2) and DATA(3) of the locations LOC(2) and LOC(3), for preventing all of the stored data {DATA(j)|j=2, 3} from being damaged by the aforementioned at least one reading behavior of the host device 50, where the aforementioned at least one reading behavior of the host device 50 may comprise sending the host commands {CMD_H(i)} for reading the stored data DATA(1) of the location LOC(1).

In Step S18, the memory controller 110 can keep using the location LOC(1) within the NV memory 120 to store the stored data DATA(1) during a storage phase S_Phase(k) of the stored data DATA(1), to prevent any data error due to the aforementioned at least one reading behavior of the host device 50 during the storage phase S_Phase(k), where the storage phase index k can be a positive integer, but the present invention is not limited thereto. For example, the storage phase index k may have an initial value such as one (e.g., k=1), and may increase with a predetermined increment such as one.

For better comprehension, by keeping using the location LOC(1) within the NV memory 120 to store the stored data DATA(1) during the storage phase S_Phase(k), the memory controller 110 can make the memory cells at the locations LOC(1), LOC(2) and LOC(3) act as a dedicated region (e.g., a quarantine region) for fighting against data loss due to the aforementioned at least one reading behavior of the host device 50, in order to prevent any stored data stored at any other location from being damaged by the aforementioned at least one reading behavior of the host device 50 during the storage phase S_Phase(k), where the memory cells at the locations LOC(2) and LOC(3) can act as barriers beside the location {LOC(1) to protect other memory cells outside the dedicated region, such as the other memory cells at other locations within the NV memory element 122-$n$, but the present invention is not limited thereto. For brevity, similar descriptions for this embodiment are not repeated in detail here.

For better comprehension, the method may be illustrated with the working flow shown in FIG. 10 and FIG. 11, but the present invention is not limited thereto. According to some embodiments, one or more steps may be added, deleted, or changed in the working flow shown in FIG. 10 and FIG. 11. For example, the memory controller 110 can perform the following operations:

(1) during the storage phase S_Phase(k) of the stored data DATA(1), the memory controller 110 can read the stored data DATA(1) from the location LOC(1) to store the stored data DATA(1) at another location LOC'(1) within the NV memory 120, to prepare the other location LOC'(1) as replacement of the location LOC(1) in advance, for example, for continuing storing the stored data DATA(1) after the memory cells at the location LOC(1) are damaged due to the aforementioned at least one reading behavior of the host device 50; and (2) the memory controller 110 can keep using the other location LOC'(1) within the NV memory 120 to store the stored data DATA(1) during another storage phase S_Phase(k') of the stored data DATA(1), to prevent any data error due to the aforementioned at least one reading behavior of the host device 50 during the other storage phase S_Phase(k');

where the aforementioned at least one reading behavior of the host device 50 may further comprise sending the host commands {CMD_H(i)} for reading the stored data DATA(1) of the other location LOC'(1), but the present invention is not limited thereto. For example, the other storage phase S_Phase(k') can be the next storage phase S_Phase(k+1) of the storage phase S_Phase(k) (e.g., k'=k+1). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data management of a memory device with aid of targeted protection control, the method being applied to a memory controller of the memory device, the memory device comprising the memory controller and a non-volatile (NV) memory, the NV memory comprising at least one NV memory element, the method comprising:

receiving a first host command from a host device, wherein the first host command indicates that reading first stored data is requested, and the first stored data is stored at a first location within the NV memory;

in response to the first host command, sending a first operating command to the NV memory to read the first stored data from the first location within the NV memory, for being returned to the host device;

monitoring a read count of the first location to determine whether the read count of the first location reaches a read count threshold, wherein the read count of the first location is recorded in a read count table within the NV memory;

in response to the read count of the first location reaching the read count threshold, monitoring at least one error bit count of other stored data of at least one other location within the NV memory to determine whether the at least one error bit count reaches an error bit count threshold, wherein the at least one other location comprises a second location within the NV memory, and the other stored data comprises second stored data stored at the second location; and in response to the at least one error bit count reaching the error bit count threshold, starting a targeted protection procedure to process the second stored data, for preventing the second stored data from being damaged by at least one reading behavior of the host device, wherein the at least one reading behavior of the host device comprises sending at least one host command which is equivalent to the first host command for reading the first stored data, and starting the targeted protection procedure to process the second stored data further comprises:
  starting the targeted protection procedure to process the second stored data, while leaving the first stored data at the first location.

2. The method of claim 1, wherein the read count of the first location is updated in response to the at least one reading behavior of the host device; and
  the method further comprises:
    receiving a plurality of second host commands from the host device, wherein each second host command among the plurality of second host commands indicates that reading the first stored data is requested; and
    in response to the plurality of second host commands, sending a plurality of second operating commands to the NV memory to read the first stored data from the first location within the NV memory, respectively, for being returned to the host device, respectively;
    wherein the at least one reading behavior of the host device further comprises sending the plurality of second host commands for reading the first stored data multiple times.

3. The method of claim 2, wherein in response to multiple reading behaviors of the host device, the read count of the first location reaches the read count threshold; and in response to the at least one error bit count reaching the error bit count threshold, starting the targeted protection procedure to process the second stored data for preventing the second stored data from being damaged by the at least one reading behavior of the host device further comprises:
  in response to the at least one error bit count reaching the error bit count threshold, starting the targeted protection procedure to process the second stored data, for preventing the second stored data from being damaged by at least one portion of reading behaviors among the multiple reading behaviors of the host device.

4. The method of claim 1, wherein the second location is adjacent to the first location within a first NV memory element among the at least one NV memory element.

5. The method of claim 1, wherein the first location corresponds to a set of first memory cells that are accessed through a first word line within a first NV memory element among the at least one NV memory element, and the second location corresponds to a set of second memory cells that are accessed through a second word line within the first NV memory element; and among all word lines within the first NV memory element, the first word line and the second word line are adjacent to each other.

6. The method of claim 1, wherein the at least one other location further comprises a third location within the NV memory, and the other stored data further comprises third stored data stored at the third location; and starting the targeted protection procedure to process the second stored data for preventing the second stored data from being damaged by the at least one reading behavior of the host device further comprises:
  in response to the read count of the first location reaching the read count threshold, starting the targeted protection procedure to process both of the second stored data and the third stored data, for preventing both of the second stored data and the third stored data from being damaged by the at least one reading behavior.

7. The method of claim 6, wherein both of the second location and the third location are adjacent to the first location within a first NV memory element among the at least one NV memory element.

8. The method of claim 6, wherein the first location corresponds to a set of first memory cells that are accessed through a first word line within a first NV memory element among the at least one NV memory element, the second location corresponds to a set of second memory cells that are accessed through a second word line within the first NV memory element, and the third location corresponds to a set of third memory cells that are accessed through a third word line within the first NV memory element; and among all word lines within the first NV memory element, the first word line and the second word line are adjacent to each other, and the first word line and the third word line are adjacent to each other.

9. The method of claim 1, wherein during the targeted protection procedure, processing the second stored data comprises:
  reading the second stored data from the second location; and
  storing the second stored data read from the second location at another second location within the NV memory, for preventing the second stored data stored at said another second location from being damaged by the at least one reading behavior of the host device.

10. The method of claim 9, wherein storing the second stored data read from the second location at said another second location within the NV memory for preventing the second stored data stored at said another second location from being damaged by the at least one reading behavior of the host device further comprises:
  storing the second stored data read from the second location at said another second location within the NV memory, for preventing the second stored data stored at said another second location from being damaged by the at least one reading behavior of the host device, to allow the second stored data stored at the second location to be damaged by the at least one reading behavior of the host device;
  wherein during the targeted protection procedure, processing the second stored data further comprises:
  after the second stored data read from the second location is stored at said another second location, updating at least one address mapping table within the NV memory to make the second stored data stored at the second location become invalid data.

11. The method of claim 1, wherein during the targeted protection procedure, processing the second stored data comprises:
  reading the second stored data from the second location, wherein the second stored data stored at the second location is protected with a first parity code;
  generating a second parity code according to the second stored data read from the second location, and storing the second parity code at another second location within the NV memory; and
  recording said another second location into at least one table within the NV memory to indicate that the second parity code is stored at said another second location, wherein the second stored data stored at the second location is further protected with the second parity code stored at said another second location.

12. The method of claim 1, further comprising:
keeping using the first location within the NV memory to store the first stored data during a first storage phase of the first stored data, to prevent any data error due to the at least one reading behavior of the host device during the first storage phase.

13. The method of claim 12, further comprising:
during the first storage phase of the first stored data, reading the first stored data from the first location to store the first stored data at another first location within the NV memory, to prepare said another first location as replacement of the first location in advance; and
keeping using said another first location within the NV memory to store the first stored data during a second storage phase of the first stored data, to prevent any data error due to the at least one reading behavior of the host device during the second storage phase.

14. A memory device, comprising:
a non-volatile (NV) memory, arranged to store information, wherein the NV memory comprises at least one NV memory element; and
a memory controller, coupled to the NV memory, arranged to control operations of the memory device, wherein the memory controller comprises:
a processing circuit, arranged to control the memory controller according to a plurality of host commands from a host device, to allow the host device to access the NV memory through the memory controller;
wherein:
the memory controller receives a first host command from the host device, wherein the first host command indicates that reading first stored data is requested, and the first stored data is stored at a first location within the NV memory;
in response to the first host command, the memory controller sends a first operating command to the NV memory to read the first stored data from the first location within the NV memory, for being returned to the host device;
the memory controller monitors a read count of the first location to determine whether the read count of the first location reaches a read count threshold, wherein the read count of the first location is recorded in a read count table within the NV memory;
in response to the read count of the first location reaching the read count threshold, the memory controller monitors at least one error bit count of other stored data of at least one other location within the NV memory to determine whether the at least one error bit count reaches an error bit count threshold, wherein the at least one other location comprises a second location within the NV memory, and the other stored data comprises second stored data stored at the second location; and
in response to the at least one error bit count reaching the error bit count threshold, the memory controller starts a targeted protection procedure to process the second stored data, for preventing the second stored data from being damaged by at least one reading behavior of the host device, wherein the at least one reading behavior of the host device comprises sending at least one host command which is equivalent to the first host command for reading the first stored data, and starting the targeted protection procedure to process the second stored data further comprises:
starting the targeted protection procedure to process the second stored data, while leaving the first stored data at the first location.

15. An electronic device comprising the memory device of claim 14, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

16. A memory controller of a memory device, the memory device comprising the memory controller and a non-volatile (NV) memory, the NV memory comprising at least one NV memory element, the memory controller comprising:
a processing circuit, arranged to control the memory controller according to a plurality of host commands from a host device, to allow the host device to access the NV memory through the memory controller;
wherein:
the memory controller receives a first host command from the host device, wherein the first host command indicates that reading first stored data is requested, and the first stored data is stored at a first location within the NV memory;
in response to the first host command, the memory controller sends a first operating command to the NV memory to read the first stored data from the first location within the NV memory, for being returned to the host device;
the memory controller monitors a read count of the first location to determine whether the read count of the first location reaches a read count threshold, wherein the read count of the first location is recorded in a read count table within the NV memory;
in response to the read count of the first location reaching the read count threshold, the memory controller monitors at least one error bit count of other stored data of at least one other location within the NV memory to determine whether the at least one error bit count reaches an error bit count threshold, wherein the at least one other location comprises a second location within the NV memory, and the other stored data comprises second stored data stored at the second location; and
in response to the at least one error bit count reaching the error bit count threshold, the memory controller starts a targeted protection procedure to process the second stored data, for preventing the second stored data from being damaged by at least one reading behavior of the host device, wherein the at least one reading behavior of the host device comprises sending at least one host command which is equivalent to the first host command for reading the first stored data, and starting the targeted protection procedure to process the second stored data further comprises:
starting the targeted protection procedure to process the second stored data, while leaving the first stored data at the first location.

* * * * *